(12) United States Patent
Atmur et al.

(10) Patent No.: US 10,267,383 B2
(45) Date of Patent: Apr. 23, 2019

(54) SELF-ALIGNING VIRTUAL ELLIPTICAL DRIVE

(71) Applicant: The Boeing Company, Chicago, IL (US)

(72) Inventors: Robert J. Atmur, Whittier, CA (US); William Patrick Sargent, Fullerton, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/585,544

(22) Filed: May 3, 2017

(65) Prior Publication Data
US 2018/0320760 A1    Nov. 8, 2018

(51) Int. Cl.
*F16H 1/32*     (2006.01)
*F16H 23/00*   (2006.01)
*H02K 7/08*     (2006.01)
*H02K 7/116*   (2006.01)
*H02K 7/14*     (2006.01)

(52) U.S. Cl.
CPC ............ *F16H 1/321* (2013.01); *F16H 23/00* (2013.01); *H02K 7/08* (2013.01); *H02K 7/116* (2013.01); *H02K 7/14* (2013.01)

(58) Field of Classification Search
CPC .......... F16H 23/00; F16H 33/10; F16H 29/02; F16H 29/06; F16H 29/08; F16H 29/10; F16H 29/12; F16H 29/14; F16H 29/16; F16H 29/18; F16H 29/20; F16H 29/22; F16H 1/321; H02K 7/116; H02K 7/1163; H02K 7/08

USPC .................................................. 475/162–164
See application file for complete search history.

(56) References Cited

U.S. PATENT DOCUMENTS

| 37,165 A | 12/1862 | Gary |
| 1,611,981 A | 12/1926 | Amberg |
| 2,275,827 A | 3/1942 | Plensler |
| 2,458,983 A | 1/1949 | Dunn |

(Continued)

FOREIGN PATENT DOCUMENTS

| CH | 233459 A | 7/1944 |
| CN | 2276093 Y | 3/1998 |

(Continued)

OTHER PUBLICATIONS

European Patent Office, Extended European Search Report in European Patent Application No. 16156922.3-1806, dated Sep. 30, 2016, 6 pages.

(Continued)

*Primary Examiner* — Jeffrey A Shapiro
(74) *Attorney, Agent, or Firm* — Kolisch Hartwell, P.C.

(57) ABSTRACT

A self-aligning wobble plate drive, including a stator gear, a wobble plate, and an output plate. The stator gear has a central stator axis and a plurality of stator teeth. The wobble plate has a wobble axis, a plurality of face teeth, and a plurality of wobble teeth, and is disposed such that the wobble axis is at a non-zero wobble angle relative to the stator axis. The output plate includes a plurality of output teeth and is substantially aligned with the stator axis. At least two of the pluralities of teeth are configured to engage with each other in a self-aligning manner such that as the wobble plate nutates around the stator gear, the wobble angle remains constant.

20 Claims, 8 Drawing Sheets

(56) References Cited

U.S. PATENT DOCUMENTS

| | | | |
|---|---|---|---|
| 2,509,391 A | 5/1950 | Hansen et al. | |
| 2,699,690 A | 1/1955 | Kobler | |
| 2,703,370 A | 3/1955 | Steensen | |
| 2,857,536 A | 10/1958 | Light | |
| 2,866,110 A | 12/1958 | Schon | |
| 2,871,382 A | 1/1959 | Bouvier | |
| 2,908,191 A | 10/1959 | Sundt | |
| 3,117,244 A | 1/1964 | Rosain et al. | |
| 3,234,393 A | 2/1966 | Ruschmann | |
| 3,249,776 A | 5/1966 | Anderson et al. | |
| 3,322,984 A | 5/1967 | Anderson | |
| 3,341,726 A | 9/1967 | Brinster et al. | |
| 3,428,839 A | 2/1969 | Singleton et al. | |
| 3,463,953 A | 8/1969 | Maxwell | |
| 3,474,272 A | 10/1969 | Newell | |
| 3,525,890 A | 8/1970 | Buchanan, Jr. | |
| 3,539,847 A | 11/1970 | Gifford | |
| 3,579,276 A | 5/1971 | Newell | |
| 3,640,154 A | 2/1972 | Massie | |
| 3,918,315 A | 11/1975 | Rouverol | |
| 3,935,750 A | 2/1976 | Maroth | |
| 4,041,808 A | 8/1977 | Fickelscher | |
| RE29,411 E | 9/1977 | Newell | |
| 4,081,702 A | 3/1978 | Neumann | |
| 4,108,017 A | 8/1978 | Rouverol | |
| 4,330,725 A | 5/1982 | Hintz | |
| 4,495,432 A | 1/1985 | Katsuma et al. | |
| 4,906,881 A | 3/1990 | Knight | |
| 5,111,102 A | 5/1992 | Meeks | |
| 5,747,915 A | 5/1998 | Benavides | |
| 5,804,898 A | 9/1998 | Kawai | |
| 5,820,504 A | 10/1998 | Geralde | |
| 5,906,142 A | 5/1999 | Shirasawa | |
| 5,954,610 A * | 9/1999 | Kamimura | B23F 5/02 409/51 |
| 6,568,929 B2 | 5/2003 | Takagi | |
| 6,664,711 B2 | 12/2003 | Baudendistel | |
| 7,165,473 B2 | 1/2007 | Kobayashi et al. | |
| 7,540,865 B2 | 6/2009 | Griffin et al. | |
| 7,824,345 B2 | 11/2010 | Euteneuer et al. | |
| 7,841,994 B2 | 11/2010 | Skujins et al. | |
| 7,850,623 B2 | 12/2010 | Griffin et al. | |
| 7,878,984 B2 | 2/2011 | Jacobsen et al. | |
| 7,914,466 B2 | 3/2011 | Davis et al. | |
| 7,914,467 B2 | 3/2011 | Layman et al. | |
| 7,969,055 B2 | 6/2011 | Titus | |
| 8,022,331 B2 | 9/2011 | Reynolds et al. | |
| 8,048,004 B2 | 11/2011 | Davis et al. | |
| 8,048,060 B2 | 11/2011 | Griffin et al. | |
| 8,105,246 B2 | 1/2012 | Voeller et al. | |
| 8,137,293 B2 | 3/2012 | Zhou et al. | |
| 8,169,118 B2 | 5/2012 | Filatov | |
| 8,182,465 B2 | 5/2012 | Griffin et al. | |
| 8,210,070 B2 * | 7/2012 | Takahashi | F16H 1/321 475/163 |
| 8,231,551 B2 | 7/2012 | Griffin et al. | |
| 8,257,279 B2 | 9/2012 | Davis et al. | |
| 8,368,269 B2 | 2/2013 | Titus | |
| 8,376,961 B2 | 2/2013 | Layman et al. | |
| 8,377,035 B2 | 2/2013 | Zhou et al. | |
| 8,409,114 B2 | 4/2013 | Parins | |
| 8,449,526 B2 | 5/2013 | Snyder et al. | |
| 8,535,243 B2 | 9/2013 | Shireman | |
| 8,551,020 B2 | 10/2013 | Chen et al. | |
| 8,551,021 B2 | 10/2013 | Voeller et al. | |
| 8,556,914 B2 | 10/2013 | Vrba | |
| 8,636,716 B2 | 1/2014 | Griffin et al. | |
| 8,646,360 B2 | 2/2014 | Kanai | |
| 9,124,150 B2 * | 9/2015 | Atmur | G05D 3/12 |
| 9,164,497 B2 * | 10/2015 | Cameron | G05B 11/011 |
| 9,281,736 B2 * | 3/2016 | Atmur | H02K 41/065 |
| 9,404,489 B1 * | 8/2016 | Atmur | F04B 43/12 |
| 9,427,866 B2 * | 8/2016 | Hasegawa | B25J 9/104 |
| 9,768,664 B2 * | 9/2017 | Atmur | H02K 7/116 |
| 9,929,623 B2 * | 3/2018 | Atmur | H02K 7/06 |
| 2009/0064812 A1 | 3/2009 | Gutmann et al. | |
| 2010/0224435 A1 | 9/2010 | Yamamori | |
| 2011/0162471 A1 * | 7/2011 | Takahashi | F16H 1/321 74/405 |
| 2013/0319145 A1 * | 12/2013 | Shimada | B60K 7/0007 74/89.16 |
| 2014/0285072 A1 * | 9/2014 | Atmur | H02K 41/065 310/75 R |
| 2015/0015174 A1 * | 1/2015 | Atmur | G05D 3/12 318/564 |
| 2015/0024896 A1 * | 1/2015 | Takahashi | F16H 1/321 475/162 |
| 2015/0091491 A1 * | 4/2015 | Cameron | G05B 11/011 318/653 |
| 2015/0224642 A1 * | 8/2015 | Hasegawa | B25J 9/104 74/416 |
| 2016/0172928 A1 * | 6/2016 | Atmur | H02K 7/06 310/37 |
| 2016/0172929 A1 * | 6/2016 | Atmur | H02K 7/06 310/37 |
| 2016/0327015 A1 * | 11/2016 | Iida | F04B 1/2021 |
| 2016/0341283 A1 * | 11/2016 | Robuck | B64C 27/14 |
| 2016/0344255 A1 | 11/2016 | Atmur et al. | |
| 2017/0122409 A1 * | 5/2017 | Atmur | H02K 41/06 |
| 2017/0191549 A1 * | 7/2017 | Atmur | F16H 1/321 |
| 2018/0034355 A1 * | 2/2018 | Peck, Jr. | H02K 41/065 |

FOREIGN PATENT DOCUMENTS

| | | |
|---|---|---|
| CN | 203098755 U | 7/2013 |
| CN | 104065202 A | 9/2014 |
| DE | 102009002587 A1 | 10/2010 |
| DE | 10237686 B4 | 4/2013 |
| EP | 0565746 A1 | 10/1993 |
| EP | 2169263 A1 | 3/2010 |
| EP | 2169263 B1 | 10/2011 |
| EP | 2535136 A1 | 12/2012 |
| EP | 2782230 A2 | 9/2014 |
| EP | 2838186 A2 | 2/2015 |
| EP | 2933531 A1 | 10/2015 |
| EP | 3096444 A1 | 11/2016 |
| EP | 3165789 A2 | 5/2017 |
| GB | 2211900 A | 7/1989 |
| GB | 2327998 A | 2/1999 |
| JE | 10028964 A1 | 1/2002 |
| JE | 10237686 A1 | 2/2004 |
| JP | S59113345 A | 6/1984 |
| JP | 60017749 A | 1/1985 |
| JP | 2014187867 A | 10/2014 |
| JP | 2015039286 A | 2/2015 |
| WO | 2008149696 A1 | 12/2008 |
| WO | 2011154981 A1 | 12/2011 |
| WO | 2014051131 A1 | 4/2014 |
| WO | 2014118284 A2 | 8/2014 |

OTHER PUBLICATIONS

European Patent Office, Extended European Search Report in European Patent Application No. 16196546.2-1762, dated May 3, 2017, 9 pages.

European Patent Office, Extended European Search Report in European Patent Application No. 16194812.0-1762, dated Jun. 7, 2017, 8 pages.

U.S. Patent and Trademark Office, Non-Final Office Action in U.S. Appl. No. 14/932,901, dated Feb. 23, 2018, 48 pages.

U.S. Patent and Trademark Office, Non-Final Office Action in U.S. Appl. No. 14/989,760, dated Sep. 21, 2017, 40 pages.

European Patent Office, Extended European Search Report in European Patent Application No. 17167409.6-1809, dated Sep. 22, 2017, 9 pages.

Antonio S de Castro; Exploring a rehnomic system; Dec. 23, 1999, retrieved from the internet at https://arxiv.org/pdf/physics/9912049.pdf, 6 pages.

Machine Design, Sometimes it Pays to be Eccentric, May 18, 2000, retrieved from the internet on Feb. 18, 2015 from http://machinedesign.com/archive/sometimes-it-pays-be-eccentric, 7 pages.

(56) References Cited

OTHER PUBLICATIONS

Machine Design, Flexible gears minimize gearhead backlash for life, Jun. 7, 2001, retrieved from the internet on Feb. 18, 2015 from http://machinedesign.com/archive/flexible-gears-minimize-gearhead-backlash-life, 4 pages.

Machine Design, Flatter reducer makes waves, Jan. 24, 2002, retrieved from the internet on Feb. 18, 2015 from http://machinedesign.com/archive/flatter-reducer-makes-waves, 4 pages.

Carl A. Nelson et al., Similarity and Equivalence of Nutating Mechanisms to Bevel Epicyclic Gear Trains for Modeling and Analysis, Journal of Mechanical Design, Mar. 2005, vol. 127, 9 pages.

M. Elmoznino et al., An electro-mechanical Pericyclic CVT (P-CVT), 12th IFToMM World Congress, Besancon, France, Jun. 18-21, 2007, 6 pages.

Francesco Fasso et al., An elemental overview of the nonholonomic Noether theorem, Oct. 18, 2009, 11 pages.

Zeke Susman, Harmonic Drive, EVE5320 Mechatronics, Department of Electrical and Computer Engineering, Utah State University, Mar. 11, 2010, retrieved from the Internet on Feb. 18, 2015 from http://mechatronics.ece.usu.edu/ece5320/Schedule/hw01-2010/hw1_Zeke_Susman_a.ppt, 27 pages.

Tom Lipton, Wabble Drive Proof of Principle, Oct. 19, 2012, retrieved from the internet on Feb. 19, 2015 from http://oxtool.blogspot.com/2012/10/wabble-drive-proof-of-principle.html, 8 pages.

Harmonic Drive Systems, Inc., Strengths of HarmonicDrive®, retrieved from the internet on Feb. 18, 2015 from http://www.hds.co.jp/english/company/business/strength/, 5 pages.

Francesco Fasso et al., Conservation of energy and momenta in nonholonomic systems with affine constraints, May 5, 2015, 16 pages.

European Patent Office, Extended European Search Report regarding European Patent Application No. 18169556.0-1012, dated Oct. 5, 2018, 10 pages.

\* cited by examiner

SELF-ALIGNING VIRTUAL ELLIPTICAL DRIVE

FIELD

This disclosure relates to wobble plate drives. More specifically, the disclosed embodiments relate to systems and methods for modifying torque with an elliptically interfacing gear system.

INTRODUCTION

Two or more gears can be used to create a mechanical advantage through a gear ratio. There are many ways to arrange gears so that a single rotation of a first gear results in more or less than one rotation of a second gear in the same amount of time. In certain applications it is desirable to have a motor with a very high gear ratio, where the gear reduction takes place in the smallest possible volume.

Historically, wobble plate drive mechanisms have seemed a promising route toward a drive having a high gear ratio within a small volume. In a wobble plate drive, one of the gears, for example a rotor gear, nutates around the other gear, for example a stator gear. As used herein, the terms "nutate" or "nutation" mean a wobble, a sway, or a circular rocking motion. The rotor gear is typically supported by a shaft or fulcrum that keeps the gear teeth in alignment. If the number of gear teeth on the rotor gear and the stator gear are different by one, then such a system would have a gear ratio equal to the number of teeth on the stator gear.

In practice, efficient and effective wobble plate drive systems have proven to be elusive, because the forces involved often lead to disengagement of the mechanism, binding, over-constraint by the fulcrum, or inefficiency due to friction, among others.

SUMMARY

A self-aligning wobble plate drive includes a stator gear, a wobble plate, and an output plate. The stator gear has a central stator axis and a plurality of stator teeth disposed on an inner cylindrical surface. The wobble plate has a wobble axis, an engaging face perpendicular to the wobble axis, a plurality of face teeth disposed on the engaging face, and a plurality of wobble teeth disposed around a perimeter of the wobble plate and configured to engage with the stator teeth. The output plate includes a plurality of output teeth configured to engage with the face teeth.

The wobble plate is disposed such that the wobble axis is at a non-zero wobble angle relative to the stator axis, and the output plate is substantially aligned with the stator axis. At least two of the pluralities of teeth are configured to engage with each other in a self-aligning manner such that as the wobble plate nutates around the stator gear, the wobble angle remains constant.

A method for operating a self-aligning wobble plate drive includes providing a stator gear, a wobble plate, and an output plate. The method further includes engaging a plurality of stator teeth of the stator gear with a plurality of wobble teeth of the wobble plate in a self-aligning manner. The method then includes engaging a plurality of face teeth of the wobble plate with a plurality of output teeth of the output plate in a self-aligning manner. Finally, the method includes inducing nutation of the wobble plate about the stator gear.

The present disclosure provides various apparatuses and methods of use thereof. In some embodiments, a wobble plate drive may include an input plate, a wobble plate, and a stator. In some embodiments, a drive may include a motor, a wobble plate, a stator, and an output plate. In some embodiments, each of the wobble plate, the stator gear, and the input plate or output plate may include a set of teeth configured to engage with each other in a self-aligning manner.

Features, functions, and advantages may be achieved independently in various embodiments of the present disclosure, or may be combined in yet other embodiments, further details of which can be seen with reference to the following description and drawings.

OVERVIEW

Various embodiments of a self-aligning wobble plate drive having a wobble plate and a stator are described below and illustrated in the associated drawings. Unless otherwise specified, a wobble plate drive and/or its various components may, but are not required to, contain at least one of the structure, components, functionality, and/or variations described, illustrated, and/or incorporated herein. Furthermore, the structures, components, functionalities, and/or variations described, illustrated, and/or incorporated herein in connection with the present teachings may, but are not required to, be included in other wobble plate drives. The following description of various embodiments is merely exemplary in nature and is in no way intended to limit the disclosure, its application, or uses. Additionally, the advantages provided by the embodiments, as described below, are illustrative in nature and not all embodiments provide the same advantages or the same degree of advantages.

EXAMPLES, COMPONENTS, AND ALTERNATIVES

The following sections describe selected aspects of exemplary wobble plate drives as well as related systems and/or methods. The examples in these sections are intended for illustration and should not be interpreted as limiting the entire scope of the present disclosure. Each section may include one or more distinct inventions, and/or contextual or related information, function, and/or structure.

Example 1

Figure 1:
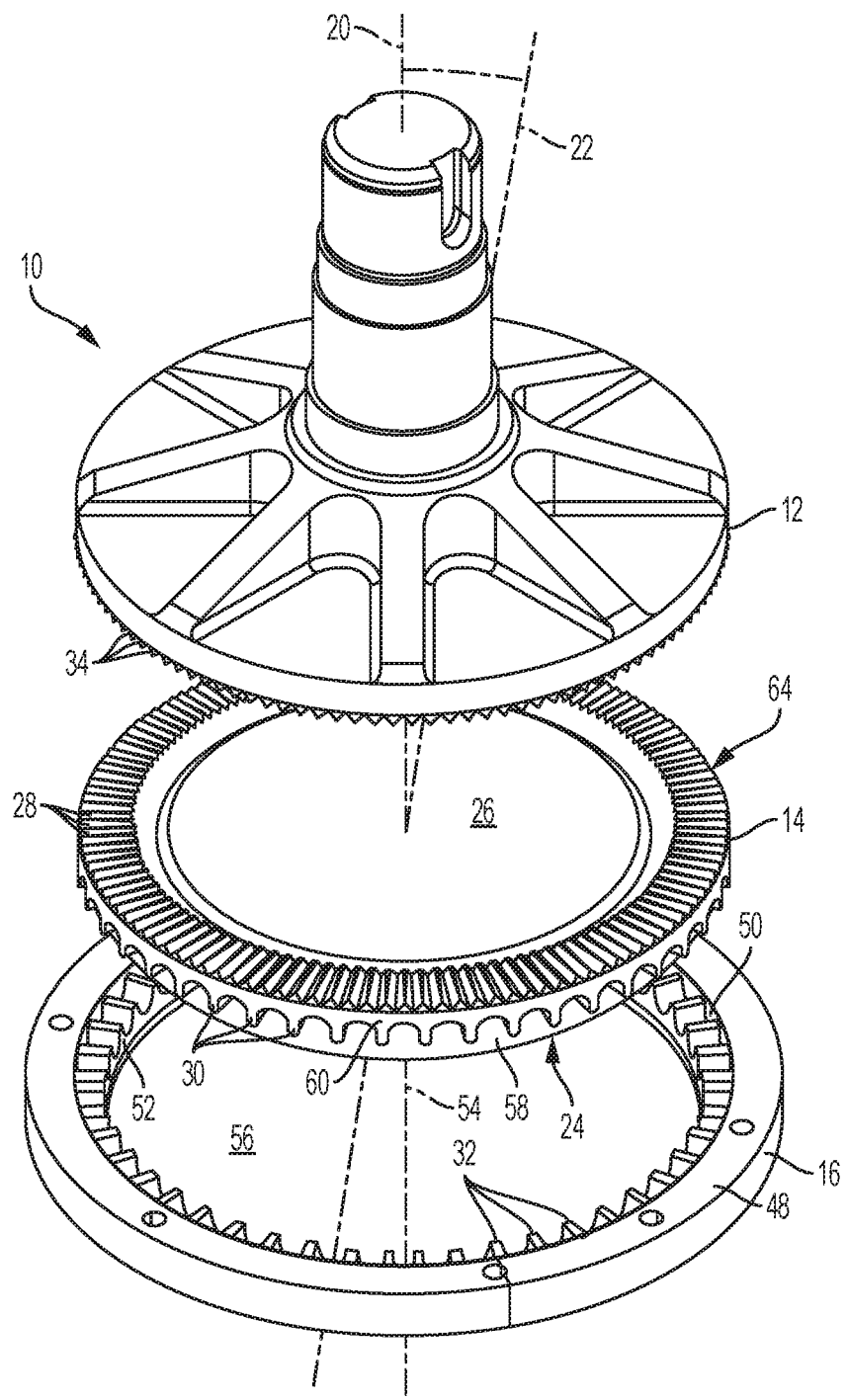
FIG. 1 is an exploded isometric view of an exemplary wobble plate drive, according to aspects of the present disclosure.

An embodiment of a self-aligning virtual elliptical drive, or wobble plate drive, can be seen in FIG. 1, generally indicated at 10. Drive 10 includes an input plate 12, a wobble plate 14, and a stator gear 16. Input plate 12, which may also be referred to an output plate depending on the intended use of the wobble plate drive, defines a rotation axis 20 about which stator gear 16 is centered. Wobble plate 14 has a wobble axis 22 disposed at a non-zero angle relative to the rotation axis, which may be referred to as a wobble angle.

Wobble plate 14 has a lower, substantially flat face 24 and an upper engaging face 26 with a plurality of face teeth 28. Face teeth 28 are disposed on front face 26, and a plurality of wobble teeth 30 are disposed around a perimeter of the wobble plate between faces 24 and 26, in a plane perpendicular to the wobble axis. The wobble teeth extend parallel to the wobble axis and from face 26 toward face 24.

Wobble plate 14 is disposed between input plate 12 and stator 16. Lower face 24 is perpendicular to the wobble axis and faces generally toward stator 16, while engaging face 26 defines a plane parallel to the lower face but faces generally toward input plate 12. Wobble teeth 30 and face teeth 28 extend in opposite directions parallel to wobble axis 22.

Figure 2:
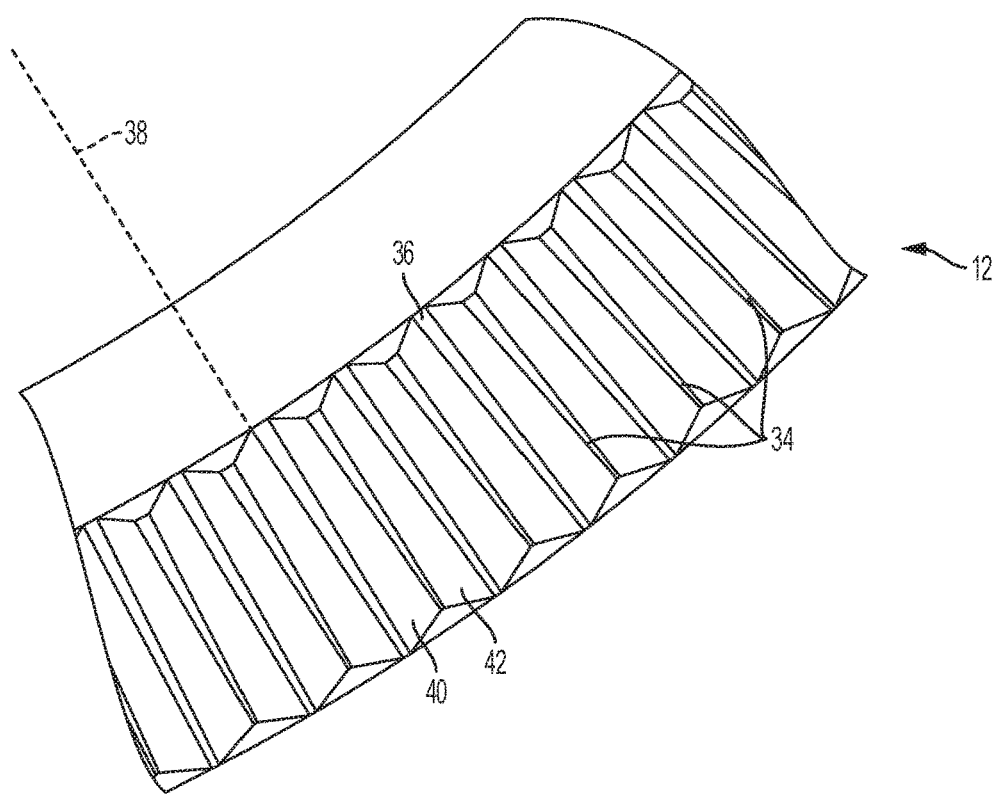
FIG. 2 is a magnified bottom plan view of a portion of an input plate of the wobble plate drive of FIG. 1.

Input plate 12 includes an annular input surface 36 at an outer portion of the input plate, as best seen in FIG. 2. Input surface 36 may be frustoconical. That is, annular input surface 36 is angled relative to a plane perpendicular to the rotation axis 20, so that every point on the annular input surface includes a frustoconical line 38 that can be extended to a vertex located on the rotation axis and below input plate 12. When the above-recited elements are assembled into a wobble plate drive, the frustoconical vertex of annular input surface 36 is proximate a center of mass of wobble plate 14.

A plurality or set of input teeth 34 is disposed on annular input surface 36. Any appropriate number of input teeth 34 may be used. Each input tooth 34 includes two driving faces 40, 42 and each driving face may be planar, composed of more than one plane, or may be composed of one or more surfaces with curvature.

As depicted in FIG. 1, front face 26 of wobble plate 14 includes an annular wobble surface 64 at an outer portion of the front face, similar to annular input surface 36 shown in FIG. 2. In other words, annular wobble surface 64 is angled relative to a plane perpendicular to wobble axis 22, so that every point on the annular wobble surface includes a frustoconical line that can be extended to a frustoconical vertex located on the wobble axis. The frustoconical vertex of annular wobble surface 64 coincides with a center of mass of wobble plate 14. In other embodiments, the wobble surface may have a different shape.

A plurality or set of face teeth 28 is disposed on annular wobble surface 64. Any suitable number of face teeth 28 may be chosen, and the number of face teeth may be more, less, or the same as the number of input teeth 34. In the depicted embodiment, there are equal numbers of face teeth 28 and input teeth 34. Each face tooth includes two driven faces, which may be planar, composed of more than one plane, or may be composed of one or more surfaces with curvature.

Wobble plate 14 is configured to engage with input plate 12. More specifically, face teeth 28 are configured to engage with input teeth 34. When the input plate rotates in a given rotation direction a driving face of an input tooth may engage with a driven face of a face tooth. That is, there may be a contact force exerted on the wobble plate by the input plate through an interaction between the driving faces of the plurality of input teeth and the driven faces of the plurality of face teeth. These contact forces may cause the wobble plate to rotate in the same given rotation direction.

In the example of drive 10, input plate 12 and wobble plate 14 interact and rotate according to a gear ratio of 1:1. That is, for every single complete rotation of the input plate, the wobble plate also completes exactly one complete rotation. Other choices for the gear ratio are possible, and would result in differing rates of rotation.

Wobble plate 14 and input plate 12 may be configured so that any contact forces exerted between the wobble plate and the input plate will point in directions that are tangent to circles which lie in planes perpendicular to the rotation axis. By configuring the wobble plate and input plate so that contact forces between the wobble plate and the input plate point in such directions, eccentric forces may be avoided. Eccentric forces may cause the plurality of face teeth 28 to disengage from the plurality of input teeth 34 or may cause the center of mass of the wobble plate to oscillate, thereby introducing undesirable vibrations into the drive.

The complementary shapes of frustoconical input surface 36 and wobble surface 64 cause input teeth 34 and face teeth 28 to engage at an angle such that if drive 10 experiences vibration or displacement, contact forces between the teeth urge input plate 12 and wobble plate 14 back into alignment. Input teeth 34 and face teeth 28 therefore engage in a self-aligning manner, such that the wobble angle remains constant as the input plate and wobble plate rotate.

As shown in FIG. 1, stator gear 16 has a base 48, and the base includes an inner cylindrical surface 50 and a stator tooth base 52. Base 48 may include attachment points configured to operatively couple stator 16 to the rest of a device using drive 10 (for example, a device within which drive 10 is incorporated). Stator 16 may be stationary relative to that device. The stator gear defines a stator axis 54 that is substantially aligned with rotation axis 20.

Stator 16 has an interior volume 56 partially defined by inner cylindrical surface 50. Interior volume 56 may be configured to accommodate some or all of wobble plate 14, as described in more detail below.

Stator teeth 32 may be disposed on either or both of inner cylindrical surface 50 and stator tooth base 52. In the embodiment of FIG. 1, the stator teeth extend from the inner cylindrical surface into interior volume 56 in a radial direction toward the rotation axis. The stator teeth also extend from stator tooth base 52 in an axial direction parallel the rotation axis. Any suitable number of stator teeth may be chosen, depending on the application and desired gear ratio.

Figure 3:
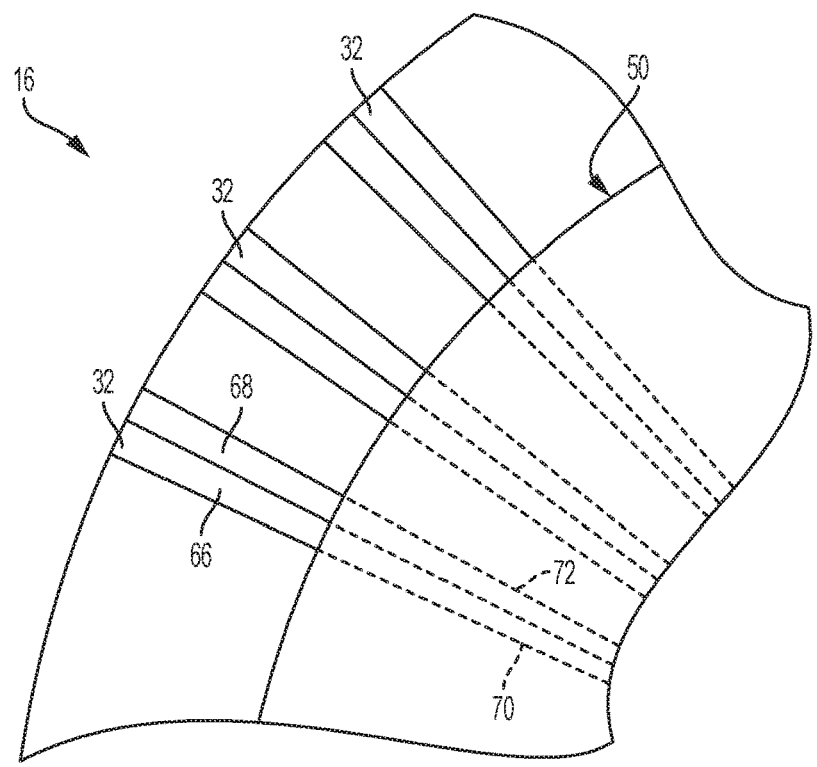
FIG. 3 is a magnified top plan view of a portion of a stator gear of the wobble plate drive of FIG. 1.

FIG. 3 is a top plan view of stator gear 16, showing a subset of the plurality of stator teeth 32. Each tooth of the plurality of stator teeth has a proximal end and a distal end, relative to rotation axis 20. The distal end of a stator tooth may be coupled to inner cylindrical surface 50. Each tooth also includes a first engaging surface 66 and on the opposite side of the tooth, a second engaging surface 68. Each engaging surface may be planar, composed of more than one plane, or composed of one or more surfaces with curvature. One or both engaging surfaces 66, 68 of a stator tooth 32 may be defined by a compound involute of a circle and an ellipse. Alternately, the curve may be the projection of a virtual ellipse onto the tooth location for all angles between 0 and 2π radians.

Each of the plurality of stator teeth 32 is wedge-shaped. That is, the first engaging surface 66 defines a line 70 that is extendable through the rotation axis. Line 70 passes through the center of mass of the wobble plate when both the wobble plate and the stator gear are coupled together within the drive. The second engaging surface 68 defines a line 72 that is also extendable through the wobble axis. Line 72 also passes through the center of mass of the wobble plate when both the wobble plate and the stator gear are coupled together within the gearbox system.

Each tooth of the plurality of stator teeth 32 includes an engaging portion and a supporting base. The engaging portion includes the first engaging surface and the second engaging surface. The supporting base couples the engaging portion to stator tooth base 52. The stator teeth may also be supported by other structures, or coupled to the stator tooth base in any appropriate manner.

As shown in FIG. 1, the plurality of wobble teeth 30 are disposed around a perimeter of wobble plate 14 between lower face 24 and engaging face 26 and in a plane perpendicular to wobble axis 22. The wobble teeth extend from an outer cylindrical surface 58 of the wobble plate in a radial direction away from the wobble axis. The wobble teeth also extend from a wobble tooth base 60 in an axial direction along the wobble axis. The wobble tooth base may be an approximately annular member coupled to or integral with the wobble plate. Connecting the wobble teeth to either or both of the cylindrical surface or the wobble tooth base may lend physical support or a degree of rigidity to the plurality of wobble teeth. Any suitable number of wobble teeth 30 may be chosen, and the number of wobble teeth may be more, less, or the same as the number of stator teeth 32.

Similarly to stator teeth 32 shown in FIG. 3, each wobble tooth 30 includes a first engaging surface and on the opposite side of the tooth, a second engaging surface. Each surface may be planar, composed of more than one plane, or composed of one or more surfaces with curvature. One or both engaging surfaces of a wobble tooth 30 may be defined by a compound involute of a circle and an ellipse. Alternately, the curve may be the projection of a virtual ellipse onto the tooth location for all angles between 0 and 2π radians.

Each of the plurality of wobble teeth is wedge shaped. That is, the first engaging surface defines a first line that is extendable through the wobble axis. The second engaging surface defines a second line that is extendable through the wobble axis. The first and second lines both pass through the center of mass of the wobble plate.

Additionally, each wobble tooth 30 includes an engaging portion and a supporting base. The engaging portion includes the first engaging surface and the second engaging surface. The supporting base connects the engaging portion to wobble tooth base 60. The wobble teeth may also be supported by other structures, or coupled to the wobble tooth base in any other appropriate manner Wobble plate 14 is configured to engage with stator gear 16. More specifically, wobble teeth 30 are configured to engage with stator teeth 32. In the case where input plate 12 rotates in a first rotation direction, the first engaging surface of a wobble tooth may engage with the first engaging surface of a stator tooth. That is, there may be a contact force exerted on the wobble plate by the stator gear through an interaction between the first engaging surfaces of the plurality of stator teeth and the first engaging surfaces of the first plurality of wobble teeth. These contact forces may cause the wobble plate to rotate in the first rotation direction and nutate in a first nutation direction.

In general, the stator gear has n stator teeth and the wobble plate has m wobble teeth, where n and m are integers that differ by one or more, but typically by one. As the wobble plate nutates around the stator gear, each tooth in the plurality of wobble teeth may engage with one tooth in the plurality of stator teeth during a single nutation. As there may be one more stator teeth than wobble teeth, the wobble plate may rotate slightly during a single nutation.

Specifically, the wobble plate may rotate 1/m of a complete rotation during a single nutation of the wobble plate. In other words, if the wobble plate rotates by 1/m of a complete rotation, perhaps due to an interaction with the input plate, the wobble plate may complete one full nutation. Thus, the wobble plate and the stator gear may interact according to a gear ratio of m:1. For every m nutations of the wobble plate, the wobble plate may rotate exactly once. Thus, the gear ratio of the disclosed systems can be determined by the number of teeth m and n of the wobble plate and stator gear, respectively.

The wobble plate and the stator gear may be configured so that any contact forces exerted between them will point in directions that are tangent to circles which lie in planes perpendicular to the rotation axis. Contact forces may point in a direction that is substantially perpendicular to the wobble axis 22 and to a radial line extending from a point of contact between a wobble tooth 30 and a stator tooth 32 to the wobble axis 22.

The wedge shapes of stator teeth 32 and wobble teeth 30 define complementary conical surfaces and cause the teeth to engage at an angle such that if drive 10 experiences vibration or displacement, contact forces resulting from engagement urge wobble plate 14 back into alignment with stator gear 16. The teeth therefore engage in a self-aligning manner, such that the wobble angle remains constant as the wobble plate nutates about the stator.

Wobble plate 14 and stator gear 16 are substantially circular in shape, with a projection of the wobble plate onto the stator being elliptical due to their differing orientations. The pluralities of wobble teeth 30 and stator teeth 32 may be contoured by projecting this virtual ellipse onto the tooth location. The elliptical projection of wobble plate 14 onto stator 16 may thereby be constrained to non-eccentric rotation. Eccentric motion, if allowed, may drive large imbalance forces creating unacceptable system performance.

The wobble plate drive may be understood as a mechanically constrained system governed by Euler's equations for a wobbling plate, which create a rotating inertial reference frame. Consider Euler's z-axis equation, $$T_z = I_z \dot{\omega}_z - (I_x - I_y) \omega_x \omega_y$$

where T is torque, I is moment of inertia, and ω is angular velocity. This equation shows that depending on the direction of torque, an axis will experience an opposing rotation. Torque, or kinetic energy, may enter the system and be accepted as opposing rotations. Input energy may be used in changing a momentum vector of wobble plate 14.

Wobble teeth 30 and stator teeth 32 may be configured to provide a mechanical constraint on motion of wobble plate 14, for example the engaging surfaces of the teeth may be defined by a compound involute of a circle and an ellipse. In such a configuration, the maximum possible rotational velocity of the wobble plate is less than or equal to the velocity needed to satisfy the solution to Euler's equations. As the wobble plate is subjected to acceleration, this results in a force acting to increase the wobble angle. The force is balanced by contact with input plate 12, keeping the wobble angle constant.

In other words, when the nutating wobble plate undergoes torque by engagement with the input plate, the wobble angle will tend to increase. The input plate is spaced from the stator at a predetermined distance such that it constrains the wobble plate relative to the stator gear. The wobble angle therefore remains constant and no part of the wobble plate is more than the predetermined distance from the stator gear as the wobble plate nutates around the stator.

The exemplary wobble plate drives described in the present teachings may either store and absorb input torque, or may output a limited amount of stored torque. In the first case, input teeth 34 of input plate 12 engage face teeth 28 of wobble plate 14 to cause the plate to rotate. Wobble teeth 30 of the wobble plate engage stator teeth 32 of stator gear 16 to induce nutation of the wobble plate. The wobble plate stores and absorbs the input torque as nutation.

The wobble plate drive may be considered in terms of the virtual ellipse formed by projecting the wobble plate onto the stator. Wobble plate 14 and stator 16 may have generally one point of contact. An edge of the virtual ellipse may define in three dimensions a continuous line of contact of the elliptically interfacing wobble plate and stator. The shape of the virtual ellipse may remain unchanged under a nutation of the wobble plate that encompasses four times the angle between the wobble axis 22 and rotation axis 20. Only the rotational frame of the line of contact, defined by Euler's equations, may advance as the nutation occurs. Each point on the line of contact may fall on a compound geometrically distorted involute function, and the function may be symmetric under both rotation and nutation, allowing continuous energy transfer to and from the virtual ellipse.

The virtual ellipse may be static as the inertial frame rotates, with all points on the line of contact rotating in their own horizontal plane at a constant angular rate. A point on a radial edge of wobble plate 14 viewed during nutation may exhibit vertical motion with a constantly changing velocity. This change in velocity may require constant acceleration of the inertia of the wobble plate, absorbing kinetic energy input to the system.

In the second case, where the wobble plate drive outputs stored torque, rotation of the wobble plate may cause the input plate to rotate. In this case, wobble plate 14 is rotating and nutating, but input plate 12 does not experience external torque.

When the wobble plate rotates in a first direction, the first driven face of a wobble tooth may engage with the first driving face of an input tooth. That is, there may be a contact force exerted on the input plate by the wobble plate through an interaction between the first driven faces of the plurality of face teeth and the first driving faces of the plurality of input teeth. These contact forces may cause the input plate to rotate in the first direction. In other words, the input plate may be considered an output plate.

Example 2

Figure 4:
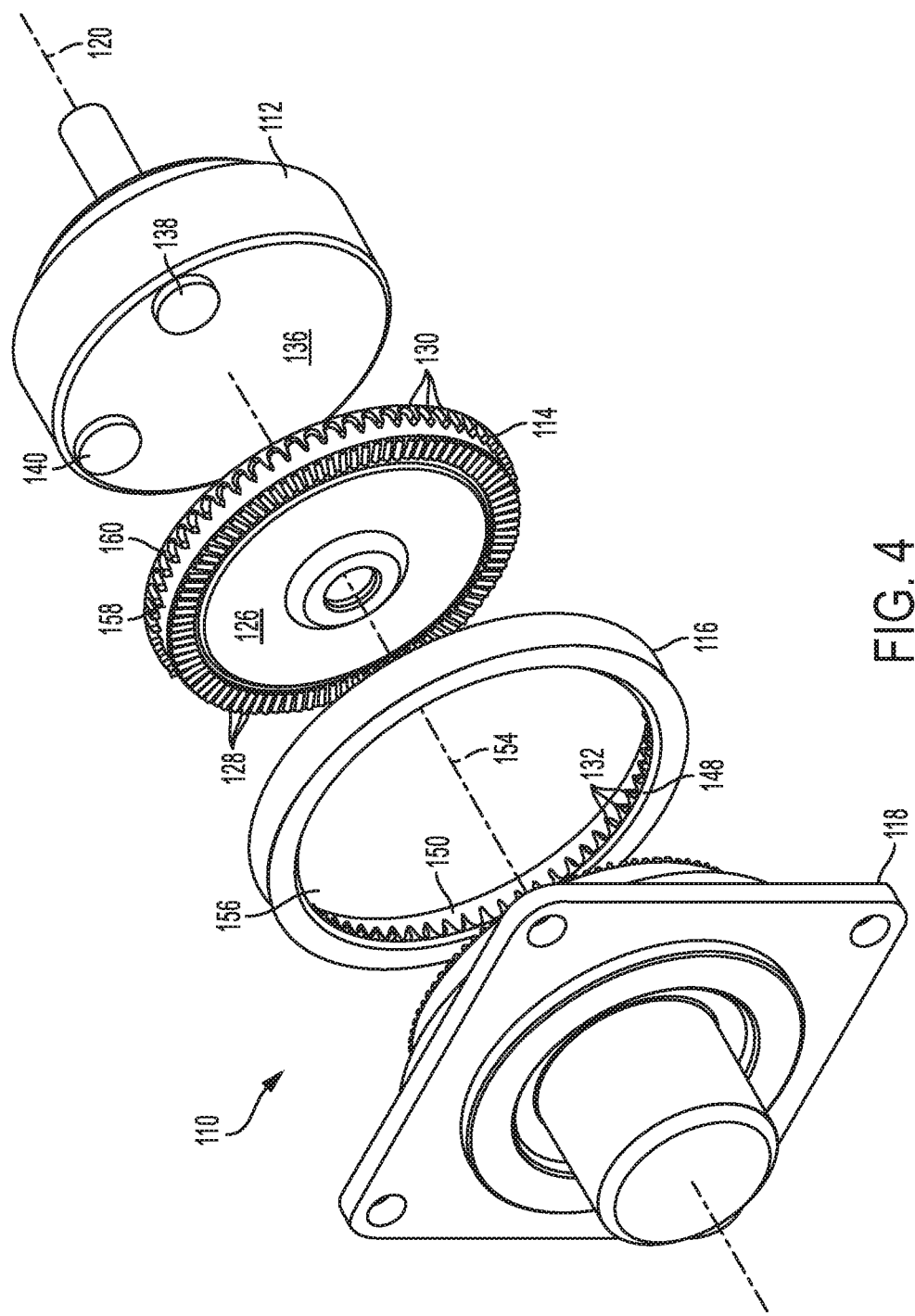
FIG. 4 is an exploded isometric front view of another exemplary wobble plate drive, according to aspects of the present disclosure.
Figure 5:
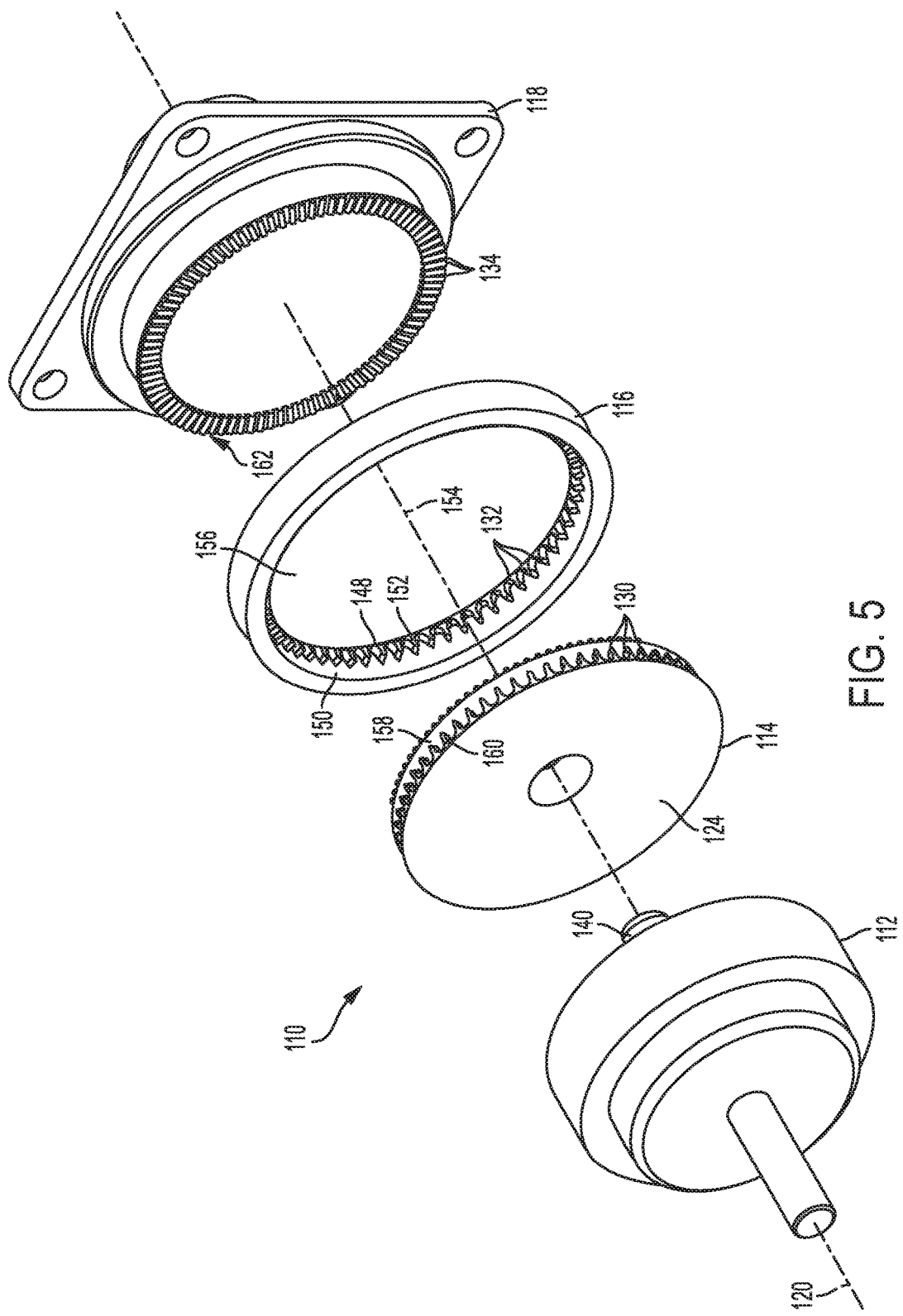
FIG. 5 is an exploded isometric rear view of the wobble plate drive of FIG. 4.

Another embodiment of a self-aligning virtual elliptical drive can be seen from different angles in FIGS. 4 and 5, and is generally indicated at 110. Drive 110 includes an input motor 112, a wobble plate 114, a stator gear 116, and an output plate 118. Motor 112 defines a rotation axis 120, about which stator gear 116 and output plate 118 are centered. Wobble plate 114 is disposed at a non-zero angle relative to the rotation axis.

Wobble plate 114 has a rear, substantially flat face 124 and a front face 126 with a plurality of face teeth 128 and a plurality of wobble teeth 130. Face teeth 128 are disposed on front face 126, and wobble teeth 130 are disposed around a perimeter of the wobble plate between faces 124 and 126, in a plane perpendicular to the wobble axis. Wobble teeth 130 and face teeth 128 extend in the same direction parallel to wobble axis 122 (shown in FIG. 6).

When drive 110 is assembled, motor 112 engages with rear face 124 of wobble plate 114 to induce the wobble plate to nutate about stator 116. The stator, which also may be referred to as a stator gear, includes a plurality of stator teeth 132 configured to engage with wobble teeth 130, and thereby induce the wobble plate to rotate. Output plate 118 includes a plurality of output teeth 134 configured to engage with face teeth 128, and the wobble plate thereby induces the output plate to rotate also. In this manner motor 112 may rotate output plate 118 with a torque determined by a first gear ratio between wobble plate 114 and stator 116, and a second gear ratio between wobble plate 114 and output plate 118.

In the embodiment pictured in FIGS. 4 and 5, input motor 112 is an electric motor with a substantially flat surface 136 perpendicular to rotation axis 120 and including a first cartridge bearing 138 and a second cartridge bearing 140 coupled to the flat surface. Bearings 138, 140 may be best seen in FIG. 4. The first bearing may be angularly spaced from the second bearing by 89 degrees, as measured with respect to axis of rotation 120. The bearings may be coupled to flat surface 136 proximate a radial edge of the surface.

Bearings 138, 140 extend from surface 136 such that either bearing 138 or bearing 140 is in contact with rear face 124 of the wobble plate. This contact is at a point angularly spaced by 45 degrees, as measured with respect to the axis of rotation, from a point of closest approach between the motor and the wobble plate. The bearings are configured to make rolling contact with rear face 124 of wobble plate 114, and thereby engage with the wobble plate to induce nutation.

In other embodiments, not pictured, a single rounded protrusion (rather than two protrusions) may be formed on flat surface 136 of motor 112. The rounded protrusion may make contact with wobble plate 114 at a point angularly spaced from the point of closest approach by 45 degrees, as measured with respect to the axis of rotation. Other embodiments may include two protrusions spaced apart by an angle between 80 and 100 degrees, but not necessarily exactly 89 degrees. Still other embodiments may include three or more projections extending from flat surface 136.

Regardless of the number of rounded protrusions, a lubricant may be disposed between motor 112 and wobble plate 114, to reduce friction between the rounded protrusions and rear face 124 of the wobble plate. Furthermore, the protrusions may take any shape, or include any mechanism tending to provide low friction rolling engagement of the protrusion(s) with wobble plate 114.

Figure 6:
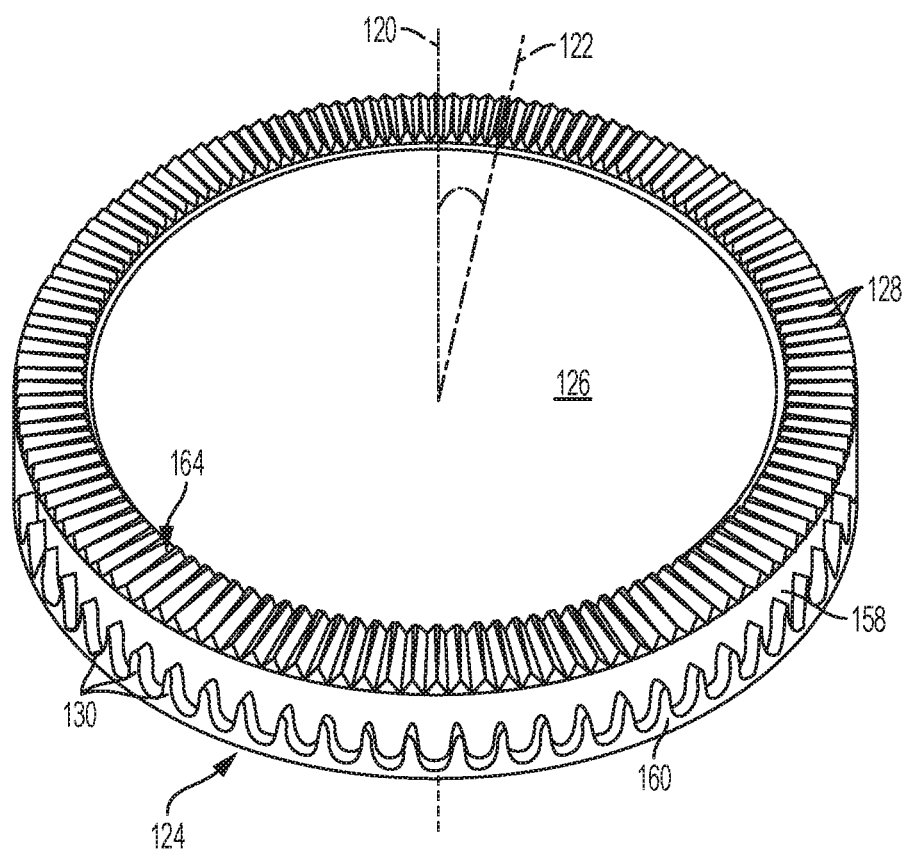
FIG. 6 is an isometric view of a wobble plate drive of the wobble plate drive of FIG. 4.

As shown in FIG. 6, wobble plate 114 is shaped similarly to a disc, with a rear face 124, a front face 126 and a central axis, or wobble axis 122. Wobble plate 114 is aligned such that wobble axis 122 forms a non-zero angle with axis of rotation 120. Rear face 124 is perpendicular to the axis of rotation, while front face 126 defines a plane parallel to the rear face. As shown in FIGS. 4-5, rear face 124 faces generally toward input motor 112 and front face 126 faces generally away from the motor.

Returning to FIGS. 4-5, the plurality of wobble teeth 130 are disposed around a perimeter of wobble plate 114 between rear face 124 and front face 126 and in a plane perpendicular to wobble axis 122. The wobble teeth extend from an outer cylindrical surface 158 of the wobble plate in a radial direction away from the wobble axis. The wobble teeth also extend from a wobble tooth base 160 in an axial direction along the wobble axis. The wobble tooth base may be an approximately annular member coupled to or integral with the wobble plate. The plurality of wobble teeth may extend from both cylindrical surface 158 and wobble tooth base 160. Connecting the wobble teeth to either or both of the cylindrical surface or the wobble tooth base may lend physical support or a degree of rigidity to the plurality of wobble teeth. Any suitable number of wobble teeth 130 may be chosen.

Each wobble tooth 130 includes a first engaging surface and on the opposite side of the tooth, a second engaging surface. Each surface may be planar, composed of more than one plane, or composed of one or more surfaces with curvature. One or both engaging surfaces of a wobble tooth 130 may be defined by a compound involute of a circle and an ellipse, as will be discussed in more detail below. Alternately, the curve may be the projection of a virtual ellipse onto the tooth location for all angles between 0 and $2\pi$ radians.

Additionally, each wobble tooth 130 includes an engaging portion and a supporting base. The engaging portion includes the first engaging surface and the second engaging surface. The supporting base connects the engaging portion to wobble tooth base 160.

For each tooth of the plurality of wobble teeth 130 and stator teeth 132, one or both of the first engaging surface and second engaging surface may be defined by a compound involute of a circle and an ellipse. That is, the curve of the second engaging surface may be defined by a first equation:

$$y = C(\tan(\varphi) - \varphi)^D \quad \text{eq. (1)}$$

where C is a constant which may be proportional to a radius of the wobble plate, $\varphi$ may take values from 0 to $$\frac{\pi}{2}$$

radians, and D may have be a positive constant less than 1. D may have a value of approximately 0.65, though other values are also possible. Equation (1) above may be normalized to unity.

Alternately, the curve of the second engaging surface may be defined by a second equation:

$$y = C(\sin(\varphi) - \varphi \cos(\varphi))^D \quad \text{eq. (2)}$$

where C is a constant which may be proportional to a radius of the wobble plate, $\varphi$ may take values from 0 to $$\frac{\pi}{2}$$

radians, and D may have be a positive constant less than 1. D may have a value of approximately 0.65, though other values are also possible.

Equation (2) above may be normalized to a radius of the wobble plate. The curve of the second engaging surface may be the projection of a virtual ellipse onto the tooth location for all angles between 0 and $2\pi$ radians. The curve of the first engaging surface may be a mirror image of the curve of the second engaging surface, reflected across a plane through the apex of the tooth and containing the axis of rotation. Also, the first engaging surface and the second engaging surface may meet smoothly at the apex of each tooth. The cross-sectional shape of the tooth may therefore be defined by a compound involute of a circle and an ellipse.

As depicted in FIG. 6, front face 126 of wobble plate 114 includes an annular wobble surface 164, which in the depicted embodiment is a frustoconical surface. That is, annular wobble surface 164 is angled relative to a plane perpendicular to wobble axis 122, so that every point on the annular wobble surface includes a frustoconical line that can be extended to a frustoconical vertex located on the wobble axis. The frustoconical vertex of annular wobble surface 164 coincides with a center of mass of wobble plate 114. In other embodiments, the wobble surface may have a different shape.

A plurality or set of face teeth 128 is disposed on annular wobble surface 164. Any suitable number of face teeth 128 may be chosen, and the number of face teeth may be more, less, or the same as the number of output teeth 134. In the depicted embodiment, there are equal numbers of face teeth 128 and output teeth 134. Each face tooth includes two driving faces, which may be planar, composed of more than one plane, or may be composed of one or more surfaces with curvature.

Referring again to FIGS. 4-5, stator gear 116 has a base 148 and the base includes an inner cylindrical surface 150 and a stator tooth base 152. Base 148 may include attachment points configured to operatively couple stator 116 to the rest of whatever device is using drive 110. Stator 116 may be stationary within the context of that device. The stator gear defines a stator axis 154 that is substantially aligned with rotation axis 120, and therefore also with the output axis. The stator is disposed between wobble plate 114 and output plate 118.

Stator 116 has an interior volume 156 which is partially defined by inner cylindrical surface 150. Interior volume 156 may be configured to accommodate some or all of wobble plate 114 as described in more detail below.

Stator teeth 132 may be disposed on either or both of inner cylindrical surface 150 and stator tooth base 152. The stator teeth extend from the inner cylindrical surface into interior volume 156 in a radial direction toward the rotation axis. The stator teeth also extend from stator tooth base 152 in an axial direction along the rotation axis. Any suitable number of stator teeth may be chosen, depending on the application and desired gear ratio. The number of stator teeth may be more, less, or the same as the number of wobble teeth 130.

Each tooth of the plurality of stator teeth may have a proximal end and a distal end, relative to rotation axis 120. The distal end of a stator tooth may be coupled to inner cylindrical surface 150. Each tooth includes a first engaging surface and on the opposite side of the tooth, a second engaging surface. Each engaging surface may be planar, composed of more than one plane, or composed of one or more surfaces with curvature.

One or both engaging surfaces of a stator tooth 132 may be defined by a compound involute of a circle and an ellipse, as previously described. Alternately, the curve may be the projection of a virtual ellipse onto the tooth location for all angles between 0 and $2\pi$ radians.

Each tooth of the plurality of stator teeth 132 includes an engaging portion and a supporting base. The engaging portion includes the first engaging surface and the second engaging surface. The supporting base couples the engaging portion to stator tooth base 152.

As depicted in FIGS. 4-5, output plate 118 includes a plurality of output teeth 134 disposed on an annular output surface 162. Output plate 118 also has an output axis substantially aligned with rotation axis 120.

Best seen in FIG. 5, output surface 162 is frustoconical. That is, annular output surface 162 is angled relative to a plane perpendicular to the rotation axis 120, so that every point on the annular output surface includes a frustoconical line that can be extended to a frustoconical vertex located on the rotation axis and forward of output plate 118. When the above-recited elements are assembled into drive 110, the frustoconical vertex of annular output surface 162 coincides with a center of mass of wobble plate 114. In other embodiments, the output surface may have different shapes, such as cylindrical or frustoconical with a different vertex.

Any suitable number of output teeth 134 may be chosen, and the number of output teeth may be more, less, or the same as the number of face teeth 128. Each output tooth may include two driven faces and each driven face may be planar, composed of more than one plane, or may be composed of one or more surfaces with curvature.

Figure 7:
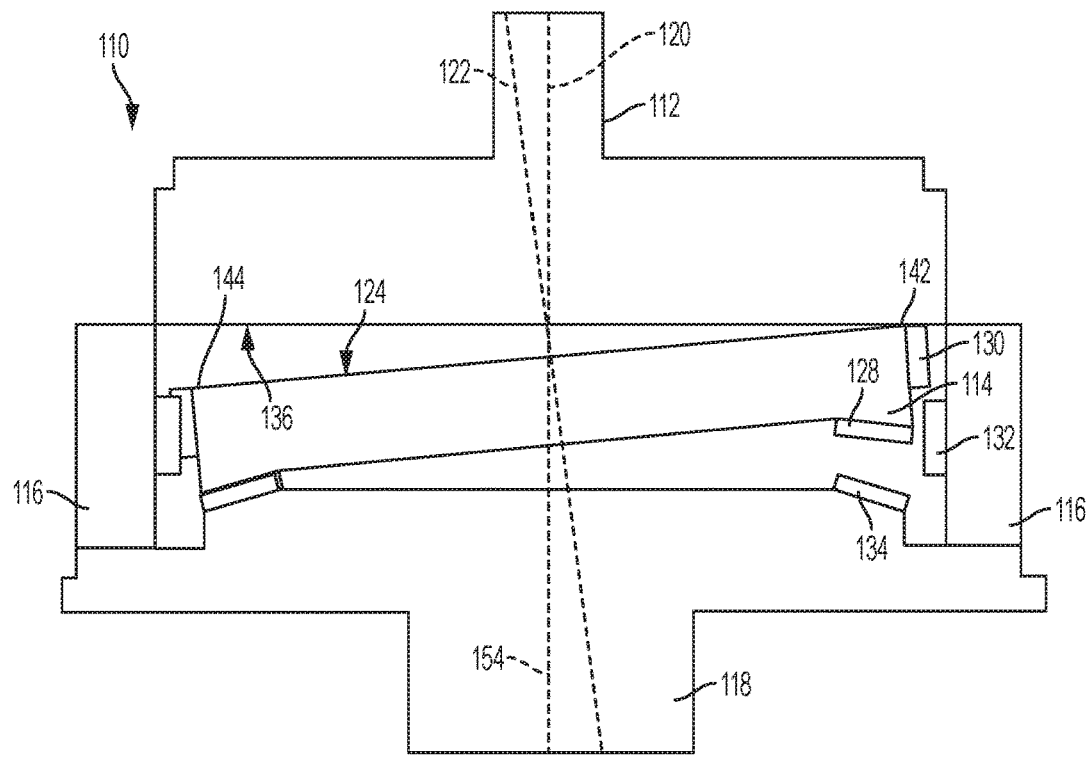
FIG. 7 is a cross-sectional view of the wobble plate drive of FIG. 4, taken along a plane parallel to a rotation axis of the drive.
Figure 8:
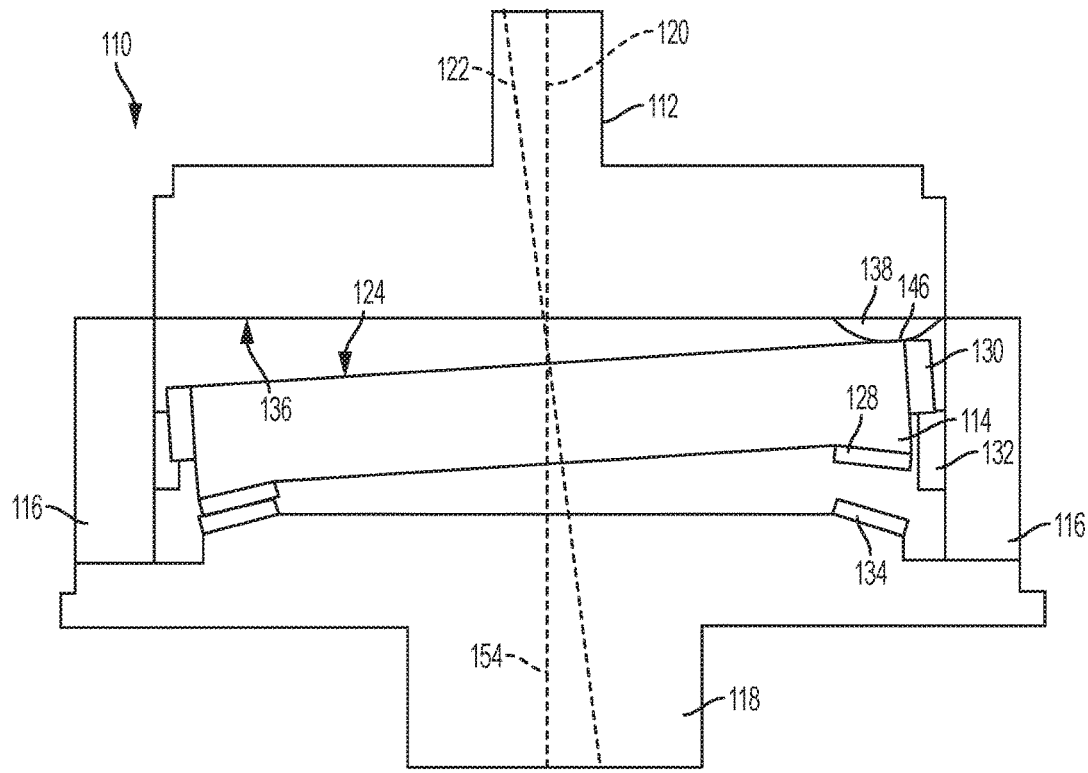
FIG. 8 is another cross-sectional view of the wobble plate drive of FIG. 4, taken along a plane rotated 45 degrees from the plane of FIG. 7.

FIGS. 7-8 are cross-sectional views of drive 110, showing motor 112, wobble plate 114, stator gear 116, and output plate 118 in an assembled configuration. The motor and output plate are aligned along stator axis 154. That is, the rotation axis, the output axis, and the stator axis are substantially aligned. The wobble plate and wobble axis 122 may be disposed at any desired and suitable non-zero angle relative to the stator axis. As wobble plate 114 nutates around stator 116 and output plate 118, the center of mass of the wobble plate is substantially stationary.

FIG. 8 is a cross-section in a plane rotated 45 degrees from the plane of the cross-section of FIG. 7, about stator axis 154, and the angle in each has been exaggerated to more clearly show relationships between components.

Wobble plate 114 is configured to engage with stator gear 116. More specifically, wobble teeth 130 are configured to engage with stator teeth 132. In the case where motor 112 rotates in a first rotation direction, the first engaging surface of a wobble tooth may engage with the first engaging surface of a stator tooth. That is, there may be a contact force exerted on the wobble plate by the stator gear through an interaction between the first engaging surfaces of the plurality of stator teeth and the first engaging surfaces of the first plurality of wobble teeth. These contact forces may cause the wobble plate to rotate in the first rotation direction and nutate in a first nutation direction.

In general, the stator gear has n stator teeth and the wobble plate has m wobble teeth, where n and m are integers that differ by one or more, but typically by one. As the wobble plate nutates around the stator gear, each tooth in the plurality of wobble teeth may engage with one tooth in the plurality of stator teeth during a single nutation. As there may be one more stator teeth than wobble teeth, the wobble plate may rotate slightly during a single nutation.

Specifically, the wobble plate may rotate 1/m of a complete rotation during a single nutation of the wobble plate. In other words, if the wobble plate rotates by 1/m of a complete rotation, perhaps due to an interaction with the motor, the wobble plate may complete one full nutation. Thus, the wobble plate and the stator gear may interact according to a gear ratio of m:1. For every m nutations of the wobble plate, the wobble plate may rotate exactly once. Thus, the gear ratio of the disclosed systems can be determined by the number of teeth m and n of the wobble plate and stator gear, respectively.

The wobble plate and the stator gear may be configured so that any contact forces exerted between them will point in directions that are tangent to circles which lie in planes perpendicular to the rotation axis. Contact forces may point in a direction that is substantially perpendicular to the wobble axis 122 and to a radial line extending from a point of contact between a wobble tooth 130 and a stator tooth 132 to the wobble axis 122.

Wobble plate 114 and stator gear 116 are substantially circular in shape, with a projection of the wobble plate onto the stator being elliptical in shape due to their differing orientations. The pluralities of wobble teeth 130 and stator teeth 132 may be contoured by projecting this virtual ellipse onto the tooth location. The elliptical projection of wobble plate 114 onto stator 116 may thereby be constrained to non-eccentric rotation. Eccentric motion, if allowed, may drive large imbalance forces creating unacceptable system performance.

Wobble plate 114 is also configured to engage with output plate 118, through engagement of face teeth 128 and output teeth 134. When the wobble plate rotates in a first rotation direction, the first driving face of a wobble tooth may engage with the first driven face of an output tooth. That is, there may be a contact force exerted on the output plate by the wobble plate through an interaction between the first driving faces of the plurality of face teeth and the first driven faces of the plurality of output teeth. These contact forces may cause the output plate to rotate in the first rotation direction. When the wobble plate rotates in a second rotation direction, contact forces between the second driving faces of the wobble teeth and the second driven faces of the output teeth may cause the output plate to rotate in the second rotation direction.

In exemplary wobble plate drive 110, the output plate and the wobble plate have the same number of teeth, i.e., the number of output teeth is equal to the number of face teeth. Accordingly, in the depicted embodiment, the output plate and the wobble plate interact and rotate according to a gear ratio of 1:1. That is, for every complete rotation of the wobble plate, the output plate also completes exactly one complete rotation. Other choices for the numbers of output and face teeth are possible and would lead to other values for the output gear ratio.

Wobble plate 114 and output plate 118 may be configured so that any contact forces exerted between them will point in directions that are tangent to circles which lie in planes perpendicular to the rotation axis. For example, a contact force may point in a direction that is substantially perpendicular to the wobble axis 122 and to radial line extending from a point of contact between a face tooth 128 and an output tooth 134 to the wobble axis 122.

By configuring the wobble plate and output plate so that contact forces between them point in such directions, eccentric forces may be avoided. Eccentric forces may cause the plurality of face teeth to disengage from the plurality of output teeth or may cause the center of mass of the wobble plate to oscillate, thereby introducing undesirable vibrations into the drive system.

Wobble plate 114 may have a 0-degree position or point 142 which may be the position or point on the wobble plate which is farthest from output plate 118, as measured in a direction parallel to rotation axis 120. At the 0-degree position, shown in FIG. 7, the wobble plate 114 may be closest to motor 112. Wobble plate 114 may have a 90-degree position or point which may be one-fourth of the way around the wobble plate from the 0-degree position in a first nutation direction. For example, as viewed from a vantage point above the wobble plate near the output plate, the 90-degree position may be ninety degrees around a perimeter of the wobble plate in a counter-clockwise direction. Continuing around the perimeter of the wobble plate, a 180-degree position or point 144 may be located on the opposite side of the wobble plate as the 0-degree position 142. The 180-degree position may mark the closest approach of the wobble plate to the output plate and the stator gear and the point of farthest distance from the motor. A 270-degree position or point may be located on the opposite side of the wobble plate as the 90-degree position.

Motor 112 may be disposed such that 0-degree point 142 is in contact with flat surface 136 of the motor between bearings 138, 140 (not shown) at a given instant of time, as depicted in FIG. 7. At that same instant of time, only one of bearings 138, 140 may be in contact with rear face 124 of wobble plate 114 at a point 146, as depicted in FIG. 8. The motor may be configured to rotate the bearings around stator axis 154 and thereby cause wobble plate 114 to nutate around stator gear 116, with wobble axis 122 precessing around the stator axis. The point of contact 146 between the bearing and wobble plate 114 may therefore move ahead of 180-degree point 144.

In a case where the motor rotates in a first direction, bearing 138 may be in contact with rear face 124 of the wobble plate at a point between 0-degree position 142 and the 270-degree position and may engage with the wobble plate to cause the wobble plate to nutate in a first direction. FIG. 8 shows bearing 138 in such a case. In a case where the motor rotates in a second direction, bearing 140 may be in contact with rear face 124 of the wobble plate at a point between 0-degree position 142 and the 90-degree position and may engage with the wobble plate to cause the wobble plate to nutate in a second direction.

When drive 110 is in use, wobble plate 114 will generally nutate and also rotate. The wobble plate may be described as configured to nutate around stator gear 116, around motor 112, and/or around output plate 118. In the case where the wobble plate is nutating in the first nutation direction, the 0-degree position of the wobble plate may move toward a current location of the 90-degree position so that, after one quarter of a full nutation, the 90-degree position has become the 0-degree position, the 180-degree position has become the 90-degree position, etc. Furthermore, the wobble plate may not rotate at the same rate it nutates. That is, as the wobble plate completes a single full nutation, the 0-degree position may travel the full perimeter of the wobble plate. During this same time, the wobble plate may rotate less than one full rotation. The rate of rotation may be determined by the rate of nutation and by the gear ratio between wobble teeth 130 and stator gear 116.

Wobble teeth 130 may engage with stator teeth 132 along one-fourth of the stator gear at any moment as the wobble plate nutates. This engagement may be in the form of a rolling contact, where the first engaging surfaces roll along one another. This rolling contact may be in contrast to many standard gear interfaces where opposing faces of gear teeth interact via a sliding contact. In general, assuming the same two surfaces are involved, rolling contact has much less friction than sliding contact between the two surfaces.

The wobble teeth 130 may only make contact with the stator teeth 132 between the 0-degree position and the 270-degree position when nutating in the first nutation direction, and this contact may be limited to rolling contact between subsets of the pluralities of wobble and the stator teeth. Thus, the wobble plate may nutate around the stator with less friction than in the case of a sliding contact. Such a configuration may lead to an efficient transfer of nutational motion or energy to rotational motion or energy.

Similarly, face teeth 128 may only engage with output teeth 134 along one-fourth of the output plate at any moment as the wobble plate nutates. When the wobble plate nutates in the first direction, the face teeth and output teeth may engage between 180-degree position 144 and the 90 degree position. By this engagement, wobble plate 114 may cause output plate 118 to rotate in the same direction as the wobble plate. In the pictured embodiment, where the gear ratio between face teeth 128 and output teeth 134 is 1, output plate 118 may also rotate at the same rate as wobble plate 114. Rotation of motor 112 thus may be transferred to output plate 118 at a higher torque.

Example 3

Figure 9:
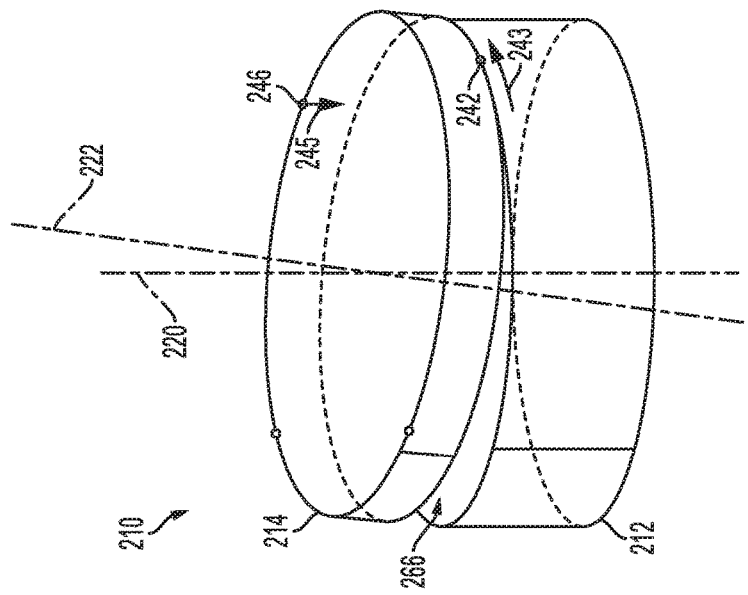
FIG. 9 is a schematic representation of an isometric view of a wobble plate and a motor, according to aspects of the present disclosure.

FIG. 9 is a schematic representation of a motor 212 and a wobble plate 214 of another embodiment of a self-aligning virtual elliptical drive, generally indicated at 210. The embodiment of FIG. 9 may be similar to wobble plate drive 110 described in Example 2, and the discussion of various features and benefits of drive 110 will not be repeated in its entirety with regard to drive 210. Similar components may be numbered similarly, but incremented by 200.

Wobble plate 214 has a wobble axis 222, a substantially flat rear face, a front face with a plurality of face teeth, and a plurality of wobble teeth disposed around a perimeter of the wobble plate between the flat face and the front face. The face teeth and wobble teeth are not indicated in FIG. 9, but may be as shown in FIG. 6, for example. The wobble plate drive further includes an output plate with output teeth and a stator with stator teeth, not pictured, but which may be as previously described in Example 2 (see FIGS. 4-5).

Motor 212 has a motor axis 220. The wobble plate is configured to nutate around the motor, with the wobble axis precessing around the motor axis. That is, the wobble plate 214 has a mobile point of closest approach 242 with respect to the motor. The mobile point of closest approach 242 may move in a direction of nutation, indicated by arrow 243, around the motor axis 220.

In exemplary drive 210, nutation of the wobble plate 214 around the motor 212 is driven by electromagnetic forces applied to the wobble plate. These forces originate from the motor and are applied to the wobble plate at a location that is ahead of mobile point of closest approach 242 in the direction of nutation 243.

A force, indicated by arrow 245 in FIG. 9, is applied to the wobble plate 214 at a leading point 246, 90 degrees from mobile point of closest approach 242. Force 245 is an attractive force and may point toward the motor 212 or along a direction parallel to the motor axis 220. As the wobble plate nutates and the 0-degree position 242 and the leading point 246 both move around the wobble plate, force 245 also moves around the wobble plate so that force 245 is always applied to the wobble plate proximate leading point 246. That is, the applied force 245 may be said to be ahead of the mobile point of closest approach in the direction of nutation 243. The applied force ahead of the mobile point of closest approach of the wobble plate causes nutation of the wobble plate.

Force 245 is a result of a response of the material of wobble plate 214 to electromagnetic fields created by motor 212. The motor includes a permanent magnet and a set of electromagnetic coils. The permanent magnet and the set of electromagnetic coils are collectively configured to create a magnetic field between the motor and the wobble plate. That is, a magnetic field is created in a gap 266 between the motor 212 and the wobble plate 214. The wobble plate is made of a magnetically susceptible material configured to respond to the magnetic field. Magnetically susceptible materials may become magnetized themselves in the presence of a magnetic field. The wobble plate responds by experiencing a force such as force 245.

Forces applied to the wobble plate may be proportional to the flux density of the magnetic field between the wobble plate and the motor. To affect an applied force at a mobile location ahead of mobile point of closest approach 242, the permanent magnet and the set of electromagnetic coils may be configured to create a magnetic field with a highest flux density at a mobile location ahead of the mobile point of closest approach in the nutation direction 243. The electromagnetic coils may be configured so that the highest flux density of magnetic field remains ahead of the mobile point of closest approach as the wobble plate nutates.

Figure 10:
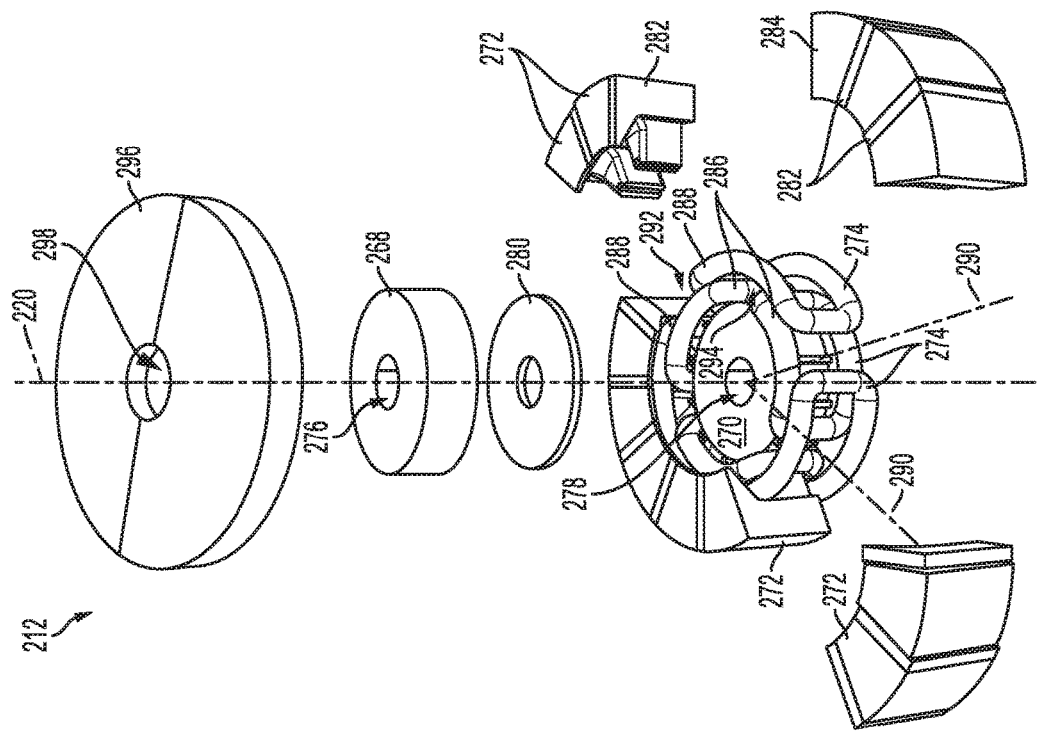
FIG. 10 is a diagrammatic representation of an isometric exploded view of the motor of FIG. 9.

FIG. 10 is a diagrammatic representation of an isometric exploded view of motor 212. The motor includes a permanent magnet 268, a motor core 270, a set of magnetically susceptible pole pieces 272, and a set of electromagnetic coils 274. Relative dispositions and orientations of components of motor 212 may be described relative to the motor axis. The term "axially" will refer to linear directions which are parallel to motor axis 220. The term "radially" will refer to linear directions which are perpendicular to the motor axis 220. The term "circumferentially" will refer to angular directions around, but not along or away from, the motor axis.

Permanent magnet 268 may have any appropriate shape and may be configured to generate any appropriate magnetic field. In the pictured example, the permanent magnet is cylindrical, with the motor axis 220 as a symmetry axis, and includes a passage 276 through the permanent magnet along the motor axis. Permanent magnet 268 may be constructed of any appropriate ferromagnetic material. Permanent magnet 268 has north and south magnetic poles substantially aligned along the motor axis 220. The magnetic field created by the permanent magnet may be referred to as a primary magnetic field.

Motor core 270 is disposed below the permanent magnet 268. Motor core 270 may be formed of a magnetically susceptible material capable of acquiring a magnetic moment when placed in a magnetic field. For example, motor core 270 may be made of electrical steel or iron. Motor core 270 may have any appropriate shape. In the pictured example, the motor core is cylindrical, with the motor axis 220 as a symmetry axis and a radius matching a radius of the permanent magnet 268. The motor core includes a passage 278 aligned with passage 276 through the permanent magnet.

Motor 212 includes a horizontal spacer 280 disposed between the permanent magnet 268 and the motor core 270. Horizontal spacer 280 may limit the magnetic field transferred from the permanent magnet to the motor core and may help regulate the magnitude of the magnetic field created by motor 212.

The set of magnetically susceptible pole pieces 272 are distributed circumferentially around the motor core 270. The pole pieces 272 may direct magnetic fields within motor 212 from one component of the motor to another. The pole pieces may be made of any suitable magnetically susceptible material, such as electrical steel. There may be any appropriate number of pole pieces. The embodiment shown in FIG. 10 includes twelve pole pieces. The pole pieces may have any appropriate shape. The twelve pole pieces shown in FIG. 10 are wedge-shaped and may alternately be described as wedge pieces. The pole pieces 272 are separated by a set of vertical spacers 282, which help to isolate magnetic fields in the pole pieces between the vertical spacers.

The set of magnetically susceptible pole pieces 272 collectively have an upper surface area 284. The pole pieces may be sized and configured so that the magnitude of the upper surface area is a predetermined multiple of an upper surface area of the permanent magnet 268. In some embodiments, the upper surface area 284 of the pole pieces may be three times the upper surface area of the permanent magnet.

The set of electromagnetic coils 274 are disposed circumferentially around the motor core 270 and between the motor core and the magnetically susceptible pole pieces 272. The set of electromagnetic coils includes a first set of electromagnetic coils and a second set of electromagnetic coils. In the pictured example, the first set of electromagnetic coils includes three inner electromagnetic coils 286 and the second set of electromagnetic coils includes three outer electromagnetic coils 288. The three outer electromagnetic coils 288 are disposed between the inner electromagnetic coils 286 and the set of magnetically susceptible pole pieces 272. The first and second sets of electromagnetic coils may include any appropriate number of coils, including two, three, and more than three coils. The numbers of coils in the first and second sets of electromagnetic coils need not be the same.

Each of the first set of electromagnetic coils 286 overlaps circumferentially with each of an adjacent pair of electromagnetic coils of the second set of electromagnetic coils 288. Each of the second set of electromagnetic coils 288 overlaps circumferentially with each of an adjacent pair of electromagnetic coils of the first set of electromagnetic coils 286. Each of the set of electromagnetic coils 274 has a coil axis 290 oriented perpendicularly to the motor axis 220. Each electromagnetic coil includes one or more conductors forming a plurality of closed loops around the coil axis 290. When each of the set of electromagnetic coils carries an electrical current, each coil creates a magnetic field within the coil oriented substantially parallel to the coil axis.

If inner and outer electromagnetic coils 286 and 288 overlap circumferentially as described above, magnetic field lines created by one of the electromagnetic coils may pass through one or more closed loops defined by another of the electromagnetic coils. Portions of the magnetic field created by one of the inner electromagnetic coils 286 may pass through each of an adjacent pair of outer electromagnetic coils 288. If there is an angular gap 292 between the adjacent pair of outer electromagnetic coils, then a portion of the magnetic field created by the inner electromagnetic coil may not pass through either of the adjacent pair of outer electromagnetic coils.

Similarly, portions of the magnetic field created by one of the outer electromagnetic coils 288 may pass through each of an adjacent pair of inner electromagnetic coils 286. If there is an angular gap 294 between the adjacent pair of inner electromagnetic coils, then a portion of the magnetic field created by the outer electromagnetic coil may not pass through either of the adjacent pair of inner electromagnetic coils.

Motor 212 includes an upper member 296 disposed over the permanent magnet and the set of magnetically susceptible pole pieces 272. The upper member may cover the upper surface area of the pole pieces and the upper surface area of the permanent magnet. The upper member includes a passage 298 substantially aligned with the passage 276 through the permanent magnet. Upper member 296 may be made of any appropriate material, such as magnetically susceptible material such as electrical steel.

The magnetic field created by the motor enters and exits the upper member in an axial direction. Wobble plate 214 is disposed with the substantially flat rear face proximate upper member 296 with a gap between the motor and the wobble plate. Magnetic field lines exit the motor through the upper member in a substantially axial direction, traverse the gap between the motor and the wobble plate, travel through the wobble plate, again traverse the gap between the wobble plate and the motor, and enter the motor through the upper member in a substantially axial direction.

When motor 212 induces wobble plate to nutate the wobble teeth of wobble plate 214 and stator teeth of the stator may engage to cause the wobble plate to rotate. The face teeth of wobble plate 214 and output teeth of the output plate may engage to cause the output plate to rotate in the same direction as the wobble plate. Electromagnetic energy of motor 212 may thus be converted to rotation of the output plate.

Manner of Operation/Use

Figure 11:
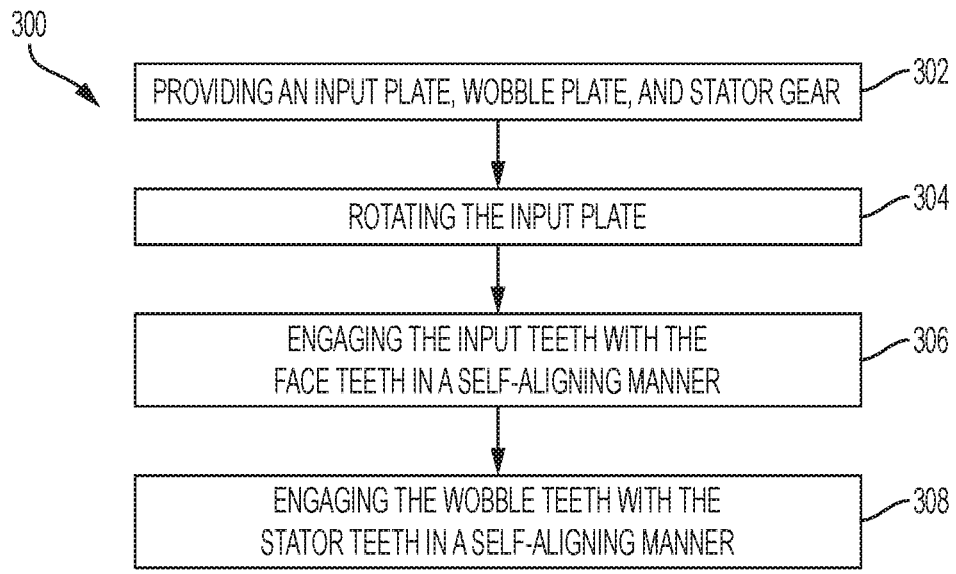
FIG. 11 is a flow chart depicting an exemplary method of use of a wobble plate drive, according to aspects of the present disclosure.

FIG. 11 depicts a method, generally indicated at 300, for operating a self-aligning virtual elliptical drive. At step 302, method 300 includes providing an input plate with input teeth, providing a wobble plate with wobble teeth and face teeth, and providing a stator gear with stator teeth. The input plate, wobble plate, and stator gear may be constructed and assembled as shown, for example, in FIG. 1 and described above in example 1, or in any other suitable manner and configuration consistent with the present teachings.

At step 304, method 300 includes rotating the input plate about a rotation axis. At step 306, method 300 includes engaging the input teeth with the face teeth, thereby causing the wobble plate to rotate. The input teeth and the face teeth may be disposed on frustoconical surfaces forming two complementary cones, such that engagement of the teeth causes the complementary cones to return to alignment. At step 308, method 300 includes engaging the wobble teeth with the stator teeth, thereby causing the wobble plate to nutate. The wobble teeth and the stator teeth may be wedge shaped, the teeth forming two complementary cones, such that the engagement of the teeth causes the complementary cones to return to alignment.

The input plate may be spaced from the stator at a predetermined distance in order to constrain the wobble plate relative to the stator gear, such that the wobble angle remains constant and no part of the wobble plate can be more than the predetermined distance from the stator gear.

In some embodiments, the method may include dissipating rotational energy by nutating the wobble plate. In other embodiments, the method may further include stopping rotation of the input plate, and then allowing inertial energy of the nutating and rotating wobble plate to rotate the input plate.

Figure 12:
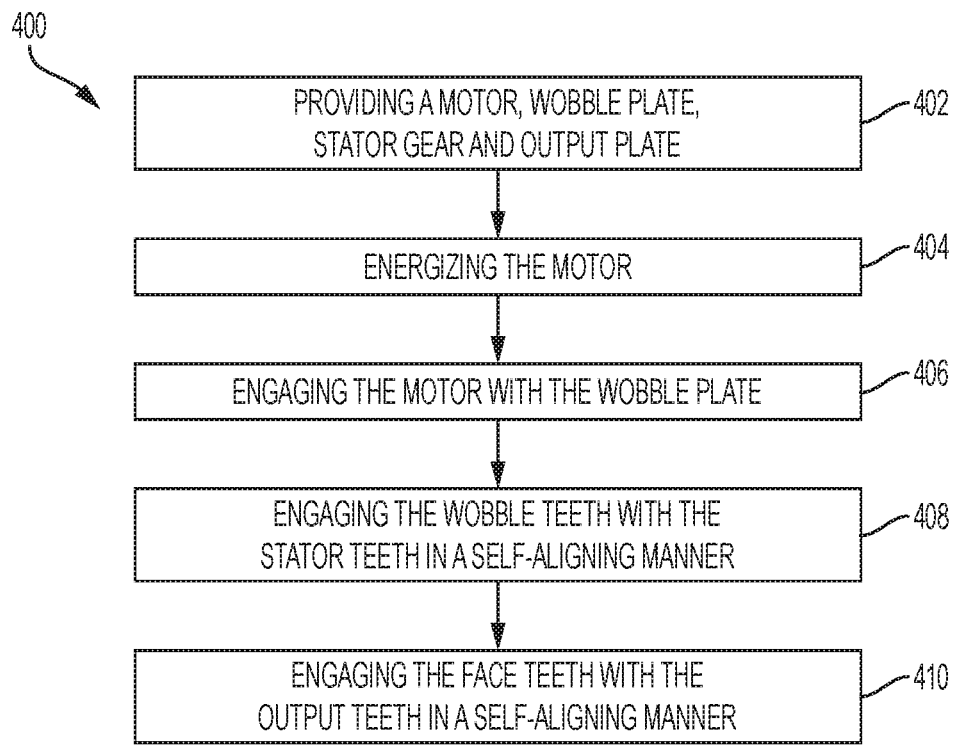
FIG. 12 is a flow chart depicting another exemplary method of use of a wobble plate drive, according to aspects of the present disclosure.

FIG. 12 depicts another method, generally indicated at 400, for operating a self-aligning virtual elliptical drive. At step 402, method 400 includes providing a motor which may include at least one rounded protrusion on a substantially flat surface and may define a rotation axis, providing a wobble plate with wobble teeth and face teeth, providing a stator gear with stator teeth, and providing an output plate with output teeth. The motor, wobble plate, stator gear and output plate may be constructed and assembled as shown, for example, in FIGS. 4-8 and described above in example 2, or in any other suitable manner and configuration consistent with the present teachings.

At step 404, method 400 includes energizing the motor, which may rotate about the rotation axis. At step 406, method 400 includes engaging the motor with the wobble plate. The engagement may consist of engaging one or more of the rounded protrusions of the motor with a substantially flat surface of the wobble plate, thereby causing the wobble plate to nutate. At step 408, method 400 includes engaging the wobble teeth with the stator teeth, thereby causing the wobble plate to rotate. At step 410, method 400 includes engaging the face teeth of the wobble plate with the output teeth of the output plate, thereby causing the output plate to rotate.

The input teeth and the face teeth may be disposed on frustoconical surfaces forming two complementary cones, such that engagement of the teeth causes the complementary cones to return to alignment. The wobble teeth and the stator teeth may be wedge shaped, the teeth forming two complementary cones, such that the engagement of the teeth causes the complementary cones to return to alignment.

In some embodiments, the method may further include stopping rotation of the motor and allowing the output plate to come to a stop. The method may further include energizing the motor to rotate in a second rotation direction about the rotation axis, thereby rotating the output plate in a second direction.

Method 400 may also be used for operating a self-aligning virtual elliptical drive consistent with the configuration described in example 3. At step 402, for example, method 400 may include providing a motor having a permanent magnet and a set of electromagnetic coils defining a central axis, providing a wobble plate of a magnetically susceptible material with wobble teeth and face teeth, providing a stator gear with stator teeth, and providing an output plate with output teeth. The motor, wobble plate, stator gear and output plate may be constructed and assembled as described above in example 3, or in any other suitable manner and configuration consistent with the present teachings.

When method 400 is used in conjunction with magnetic forces, then at step 404, method 400 may include energizing the motor, which creates a magnetic field between the motor and the wobble plate with a highest flux density at a mobile location. At step 406, method 400 in this case includes engaging the motor with the wobble plate by magnetizing the magnetically susceptible material of the wobble plate with the magnetic field of the motor and thereby applying a force on the wobble plate. The force may be applied at the mobile location of highest flux density, leading a point of closest approach between the wobble plate and the motor, and causing the wobble plate to nutate.

At step 408, method 400 includes engaging the wobble teeth with the stator teeth, thereby causing the wobble plate to rotate. At step 410, method 400 includes engaging the face teeth of the wobble plate with the output teeth of the output plate, thereby causing the output plate to rotate. In some embodiments, the method may further include stopping rotation of the motor and allowing the output plate to come to a stop. When used in conjunction with magnetic forces, the method may further include energizing the motor to move the mobile location of highest flux density in an opposite direction, thereby rotating the output plate in a second direction.

Methods of use according to the present teachings may be employed in conjunction with any of the mechanical virtual elliptical drive embodiments previously described. Although various steps of methods 300 and 400 have been described and are depicted in FIGS. 11-12, the steps need not necessarily all be performed, in some cases may be performed in a different order than the order shown, and in some cases may be performed simultaneously.

ADDITIONAL EXAMPLES

This section describes additional aspects and features of examples, presented without limitation as a series of paragraphs, some or all of which may be alphanumerically designated for clarity and efficiency. Each of these paragraphs can be combined with one or more other paragraphs, and/or with disclosure from elsewhere in this application in any suitable manner. Some of the paragraphs below expressly refer to and further limit other paragraphs, providing without limitation examples of some of the suitable combinations.

A. A wobble plate drive, comprising:
a stator gear having a central stator axis and a plurality of stator teeth disposed on an inner cylindrical surface;
a wobble plate having a wobble axis disposed at a non-zero wobble angle relative to the stator axis, an engaging face perpendicular to the wobble axis, a plurality of face teeth disposed on the engaging face, and a plurality of wobble teeth disposed around a perimeter of the wobble plate and configured to engage with the stator teeth; and
an output plate substantially aligned with the stator axis and having a plurality of output teeth configured to engage with the face teeth;
wherein at least two of the pluralities of teeth are configured to engage with each other in a self-aligning manner such that as the wobble plate nutates around the stator gear, the wobble angle remains constant.

A1. The wobble plate drive of paragraph A, wherein:
at least one of the wobble teeth is wedge shaped, with a surface of the at least one wobble tooth defining a first line extendable through a center of mass of the wobble plate; and
at least one of the stator teeth is wedge shaped, with a surface of the at least one stator tooth defining a second line extendable through a center of mass of the wobble plate.

A2. The wobble plate drive of paragraph A, wherein:
The face teeth are disposed on a frustoconical surface of the wobble plate such that a center of mass of the wobble plate coincides with a vertex of the frustoconical surface of the wobble plate; and
the output teeth are disposed on a frustoconical surface of the output plate such that the center of mass of the wobble plate coincides with a vertex of the frustoconical surface of the output plate.

A3. The wobble plate drive of paragraph A, wherein the wobble plate is constrained such that during nutation no part of the wobble plate is more than a predetermined distance from the stator gear.

A4. The wobble plate drive of paragraph A, wherein the wobble teeth and the face teeth extend in opposite directions parallel to the wobble axis, and the wobble plate is disposed between the stator gear and the output plate.

A5. The wobble plate drive of paragraph A, wherein the wobble teeth and the face teeth extend in the same direction parallel to the wobble axis, and the stator gear is disposed between the wobble plate and the output plate.

A6. The wobble plate drive of paragraph A5, further comprising a motor configured to induce nutation of the wobble plate about the stator gear, wherein nutation of the wobble plate about the stator gear causes the wobble plate to rotate, and rotation of the wobble plate causes the output plate to rotate.

A7. The wobble plate drive of paragraph A6, wherein:
the motor is an electric motor having a substantially flat surface and at least one round protrusion extending from the substantially flat surface;
the wobble plate has a substantially flat face opposite the engaging face; and
the at least one round protrusion is configured to engage with the substantially flat face of the wobble plate.

A8. The wobble plate drive of paragraph A6, wherein:
the motor includes a permanent magnet and a set of electromagnetic coils;
the wobble plate is made of a magnetically susceptible material; and
the permanent magnet and the set of electromagnetic coils are collectively configured to create a magnetic field between the motor and the wobble plate with a highest flux density at a mobile location.

B. A wobble plate drive, comprising:
a stator gear having a central stator axis and a plurality of stator teeth disposed on an inner cylindrical surface;
a wobble plate having a wobble axis disposed at a non-zero wobble angle relative to the stator axis, an engaging face perpendicular to the wobble axis, a plurality of face teeth disposed on the engaging face, and a plurality of wobble teeth disposed around a perimeter of the wobble plate in a plane perpendicular to both the engaging face and the wobble axis; and
an output plate substantially aligned with the stator axis and having a plurality of output teeth configured to engage with the face teeth; and
means for self-aligning engagement of the stator teeth with the wobble teeth, such that the wobble angle remains constant as the wobble plate nutates around the stator gear.

B1. The wobble plate drive of paragraph B, wherein:
at least one of the wobble teeth is wedge shaped, with a surface of the at least one wobble tooth defining a first line extendable through a center of mass of the wobble plate; and
at least one of the stator teeth is wedge shaped, with a surface of the at least one stator tooth defining a second line extendable through a center of mass of the wobble plate.

B2. The wobble plate drive of paragraph B, wherein:
the face teeth are disposed on a frustoconical surface of the wobble plate such that a center of mass of the wobble plate coincides with a vertex of the frustoconical surface of the wobble plate; and
the output teeth are disposed on a frustoconical surface of the output plate such that the center of mass of the wobble plate coincides with a vertex of the frustoconical surface of the output plate.

B3. The wobble plate drive of paragraph B, wherein the wobble plate is constrained such that during nutation no part of the wobble plate is more than a predetermined distance from the stator gear.

B4. The wobble plate drive of paragraph B, wherein the wobble teeth and the face teeth extend in opposite directions parallel to the wobble axis, and the wobble plate is disposed between the stator gear and the output plate.

B5. The wobble plate drive of paragraph B, wherein the wobble teeth and the face teeth extend in the same direction parallel to the wobble axis, and the stator gear is disposed between the wobble plate and the output plate.

C. A method of operating a wobble plate drive, comprising:
providing a stator gear, a wobble plate, and an output plate;
engaging a plurality of stator teeth of the stator gear with a plurality of wobble teeth of the wobble plate in a self-aligning manner;
engaging a plurality of face teeth of the wobble plate with a plurality of output teeth of the output plate in a self-aligning manner; and
inducing nutation of the wobble plate about the stator gear.

C1. The method of paragraph C, wherein inducing nutation of the wobble plate includes:
energizing a motor to rotate about a rotation axis, the motor having a substantially flat surface and at least one rounded protrusion extending from the substantially flat surface; and
engaging the at least one rounded protrusion with a substantially flat surface of the wobble plate, thereby causing the wobble plate to nutate.

C2. The method of paragraph C, wherein inducing nutation of the wobble plate includes:
energizing a motor including a permanent magnet and a set of electromagnetic coils to create a magnetic field between the motor and the wobble plate with a highest flux density at a mobile location, thereby causing the wobble plate to nutate.

C3. The method of paragraph C, wherein:
inducing nutation of the wobble plate includes rotating the output plate;
rotating the output plate when the face teeth are engaged with the output teeth causes the wobble plate to rotate; and
rotation of the wobble plate when the stator teeth are engaged with the wobble teeth causes the wobble plate to nutate.

C4. The method of paragraph C, further including constraining the wobble plate such that during nutation no part of the wobble plate is more than a predetermined distance from the stator gear.

ADVANTAGES, FEATURES, BENEFITS

The different embodiments of a self-aligning wobble plate drive described herein provide several advantages over known solutions for designing compact and cost effective wobble plate drives. For example, the illustrative embodiments of a self-aligning wobble plate drive described herein allow a drive without a supporting shaft or fulcrum. Additionally, and among other benefits, illustrative embodiments of the self-aligning wobble plate described herein reduce vibration, heat produced by friction, and binding of gear teeth. No known system or device can perform these functions, particularly in such a small volume. However, not all embodiments described herein provide the same advantages or the same degree of advantage.

CONCLUSION

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only, and do not constitute a characterization of any claimed invention. The subject matter of the invention(s) includes all novel and nonobvious combinations and subcombinations of the various elements, features, functions, and/or properties disclosed herein. The following claims particularly point out certain combinations and subcombinations regarded as novel and nonobvious. Invention(s) embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the invention(s) of the present disclosure.

We claim:

1. A wobble plate drive, comprising:
a stator gear having a central stator axis and a plurality of stator teeth disposed on an inner cylindrical surface;
a wobble plate having a wobble axis disposed at a non-zero wobble angle relative to the stator axis, an engaging face perpendicular to the wobble axis, a plurality of face teeth disposed on the engaging face, and a plurality of wobble teeth disposed around a perimeter of the wobble plate and configured to engage with the stator teeth; and
a rotor plate substantially aligned with the stator axis and having a plurality of rotor teeth configured to engage with the face teeth;
wherein at least two of the pluralities of teeth are configured to engage with each other in a self-aligning manner such that as the wobble plate nutates around the stator gear, the wobble angle remains constant without support from a fulcrum.

2. The wobble plate drive of claim 1, wherein:
at least one of the wobble teeth is wedge shaped, with a surface of the at least one wobble tooth defining a first line extendable through a center of mass of the wobble plate; and
at least one of the stator teeth is wedge shaped, with a surface of the at least one stator tooth defining a second line extendable through a center of mass of the wobble plate.

3. The wobble plate drive of claim 1, wherein:
The face teeth are disposed on a frustoconical surface of the wobble plate such that a center of mass of the wobble plate coincides with a vertex of the frustoconical surface of the wobble plate; and
the rotor teeth are disposed on a frustoconical surface of the rotor plate such that the center of mass of the wobble plate coincides with a vertex of the frustoconical surface of the rotor plate.

4. The wobble plate drive of claim 1, wherein the wobble plate is constrained such that during nutation no part of the wobble plate is more than a predetermined distance from the stator gear.

5. The wobble plate drive of claim 1, wherein the wobble teeth and the face teeth extend in opposite directions parallel to the wobble axis, and the wobble plate is disposed between the stator gear and the rotor plate.

6. The wobble plate drive of claim 1, wherein the wobble teeth and the face teeth extend in the same direction parallel to the wobble axis, and the stator gear is disposed between the wobble plate and the rotor plate.

7. The wobble plate drive of claim 6, further comprising a motor configured to induce nutation of the wobble plate about the stator gear, wherein nutation of the wobble plate about the stator gear causes the wobble plate to rotate, and rotation of the wobble plate causes the rotor plate to rotate.

8. The wobble plate drive of claim 7, wherein:
the motor includes a permanent magnet and a set of electromagnetic coils;
the wobble plate is made of a magnetically susceptible material; and
the permanent magnet and the set of electromagnetic coils are collectively configured to create a magnetic field between the motor and the wobble plate with a moving point of highest flux density.

9. A wobble plate drive, comprising:
a stator gear having a central stator axis and a plurality of stator teeth disposed on an inner cylindrical surface;
a wobble plate having a wobble axis disposed at a non-zero wobble angle relative to the stator axis, an engaging face perpendicular to the wobble axis, a plurality of face teeth disposed on the engaging face, and a plurality of wobble teeth disposed around a perimeter of the wobble plate in a plane perpendicular to both the engaging face and the wobble axis; and
a rotor plate substantially aligned with the stator axis and having a plurality of rotor teeth configured to engage with the face teeth; and
means for self-aligning engagement of the stator teeth with the wobble teeth, such that the wobble angle remains constant without support from a fulcrum as the wobble plate nutates around the stator gear.

10. The wobble plate drive of claim 9, wherein:
at least one of the wobble teeth is wedge shaped, with a surface of the at least one wobble tooth defining a first line extendable through a center of mass of the wobble plate; and
at least one of the stator teeth is wedge shaped, with a surface of the at least one stator tooth defining a second line extendable through a center of mass of the wobble plate.

11. The wobble plate drive of claim 9, wherein:
the face teeth are disposed on a frustoconical surface of the wobble plate such that a center of mass of the wobble plate coincides with a vertex of the frustoconical surface of the wobble plate; and
the rotor teeth are disposed on a frustoconical surface of the rotor plate such that the center of mass of the wobble plate coincides with a vertex of the frustoconical surface of the rotor plate.

12. The wobble plate drive of claim 9, wherein the wobble plate is constrained such that during nutation no part of the wobble plate is more than a predetermined distance from the stator gear.

13. The wobble plate drive of claim 9, wherein the wobble teeth and the face teeth extend in opposite directions parallel to the wobble axis, and the wobble plate is disposed between the stator gear and the rotor plate.

14. The wobble plate drive of claim 9, wherein the wobble teeth and the face teeth extend in the same direction parallel to the wobble axis, and the stator gear is disposed between the wobble plate and the rotor plate.

15. A method of operating a wobble plate drive, comprising:
providing a stator gear, a wobble plate, and a rotor plate;
engaging a plurality of stator teeth of the stator gear with a plurality of wobble teeth of the wobble plate in a self-aligning manner;
engaging a plurality of face teeth of the wobble plate with a plurality of rotor teeth of the rotor plate in a self-aligning manner; and
inducing nutation of the wobble plate about the stator gear such that an angle between the wobble plate and the stator gear remains constant without support from a fulcrum.

16. The method of claim 15, wherein inducing nutation of the wobble plate includes:
energizing a motor to rotate about a rotation axis, the motor having a substantially flat surface and at least one rounded protrusion extending from the substantially flat surface; and
engaging the at least one rounded protrusion with a substantially flat surface of the wobble plate, thereby causing the wobble plate to nutate.

17. The method of claim 15, wherein inducing nutation of the wobble plate includes:
energizing a motor including a permanent magnet and a set of electromagnetic coils to create a magnetic field between the motor and the wobble plate with a highest flux density at a mobile location, thereby causing the wobble plate to nutate.

18. The method of claim 15, wherein:
inducing nutation of the wobble plate includes rotating the rotor plate;
rotating the rotor plate when the face teeth are engaged with the rotor teeth causes the wobble plate to rotate; and
rotation of the wobble plate when the stator teeth are engaged with the wobble teeth causes the wobble plate to nutate.

19. The method of claim 15, further including constraining the wobble plate such that during nutation no part of the wobble plate is more than a predetermined distance from the stator gear.

20. The wobble plate drive of claim 1, wherein the at least two of the pluralities of teeth are configured to engage with each other in a self-aligning manner such that as the wobble plate nutates around the stator gear, the wobble angle remains constant without supportive contact between the wobble plate and a centrally disposed support structure.

* * * * *